United States Patent
O'Neill

(10) Patent No.: US 9,226,139 B2
(45) Date of Patent: *Dec. 29, 2015

(54) METHODS AND APPARATUS FOR EXTENDING MOBILE IP

(75) Inventor: Alan O'Neill, Henley Beach (AU)

(73) Assignee: QUALCOMM Incorporated, San Diego, CA (US)

(*) Notice: Subject to any disclaimer, the term of this patent is extended or adjusted under 35 U.S.C. 154(b) by 936 days.

This patent is subject to a terminal disclaimer.

(21) Appl. No.: 12/504,501

(22) Filed: Jul. 16, 2009

(65) Prior Publication Data

US 2009/0274102 A1 Nov. 5, 2009

Related U.S. Application Data

(63) Continuation of application No. 10/425,151, filed on Apr. 29, 2003, and a continuation-in-part of application No. 10/413,888, filed on Apr. 14, 2003, now Pat. No. 7,366,147.

(60) Provisional application No. 60/465,510, filed on Apr. 25, 2003, provisional application No. 60/426,332, filed on Nov. 14, 2002, provisional application No. 60/372,655, filed on Apr. 15, 2002.

(51) Int. Cl.
*H04W 8/26* (2009.01)
*H04L 29/08* (2006.01)
(Continued)

(52) U.S. Cl.
CPC ............ *H04W 8/26* (2013.01); *H04L 12/4633* (2013.01); *H04L 29/06* (2013.01); *H04L 29/12311* (2013.01); *H04L 61/2084* (2013.01); *H04L 63/0281* (2013.01); *H04L 63/0428* (2013.01); *H04L 67/14* (2013.01); *H04L 67/2819* (2013.01); *H04L 67/325* (2013.01); *H04L 67/327* (2013.01); *H04L 69/08* (2013.01); *H04L 69/167* (2013.01); *H04W 12/02* (2013.01); *H04L 63/0227* (2013.01); *H04L 63/04* (2013.01); *H04L 63/123* (2013.01); *H04W 4/06* (2013.01); *H04W 36/18* (2013.01); *H04W 40/00* (2013.01); *H04W 52/0216* (2013.01); *H04W 52/0219* (2013.01);
(Continued)

(58) Field of Classification Search
None
See application file for complete search history.

(56) References Cited

U.S. PATENT DOCUMENTS

| 5,325,432 A | 6/1994 | Gardeck et al. |
| 5,347,450 A | 9/1994 | Nugent |

(Continued)

FOREIGN PATENT DOCUMENTS

| EP | 1244261 A2 | 9/2002 |
| EP | 1304835 A2 | 4/2003 |

(Continued)

OTHER PUBLICATIONS

Mobile IPv4 traversal across VPN or "NAT and VPN" Gateways, Intel Labs Technical Overview, http://www.connectathon.org/talks02/farid.pdf, (Mar. 6, 2002) pp. 1-12.*

(Continued)

*Primary Examiner* — Marcus R Smith
(74) *Attorney, Agent, or Firm* — Anthony R. Morris

(57) ABSTRACT

Methods and apparatus for extending Mobile IP to enable a Mobile IP Home Agent to forward to a default proxy MN server when it does not have a current binding for a MN home address. This can be used to route traffic when the MN is absent and to add processes onto the Proxy MN server that enables application intelligence at the Proxy MN server to act on behalf of the MN when the MN so wishes, e.g., substituting for the MN while the MN is in sleep mode or otherwise unavailable.

28 Claims, 10 Drawing Sheets

(51) Int. Cl.

| | | |
|---|---|---|
| *H04L 12/46* | (2006.01) | |
| *H04L 29/06* | (2006.01) | |
| *H04L 29/12* | (2006.01) | |
| *H04W 12/02* | (2009.01) | |
| *H04W 80/04* | (2009.01) | |
| *H04W 88/18* | (2009.01) | |
| *H04W 4/06* | (2009.01) | |
| *H04W 36/18* | (2009.01) | |
| *H04W 40/00* | (2009.01) | |
| *H04W 80/00* | (2009.01) | |
| *H04W 92/24* | (2009.01) | |
| *H04W 52/02* | (2009.01) | |

(52) U.S. Cl.
CPC .............. *H04W 80/00* (2013.01); *H04W 80/04* (2013.01); *H04W 88/182* (2013.01); *H04W 92/24* (2013.01)

(56) References Cited

U.S. PATENT DOCUMENTS

| | | |
|---|---|---|
| 5,450,405 A | 9/1995 | Maher et al. |
| 5,473,605 A | 12/1995 | Grube et al. |
| 5,491,749 A | 2/1996 | Rogaway |
| 5,491,835 A | 2/1996 | Sasuta et al. |
| 5,511,232 A | 4/1996 | O'Dea et al. |
| 5,513,381 A | 4/1996 | Sasuta |
| 5,572,528 A | 11/1996 | Shuen |
| 5,737,328 A | 4/1998 | Norman et al. |
| 5,806,007 A | 9/1998 | Raith et al. |
| 5,898,922 A | 4/1999 | Reininghaus |
| 5,903,559 A | 5/1999 | Acharya et al. |
| 5,987,323 A | 11/1999 | Huotari |
| 6,144,671 A | 11/2000 | Peripanathan et al. |
| 6,256,300 B1 | 7/2001 | Ahmed et al. |
| 6,282,183 B1 | 8/2001 | Harris et al. |
| 6,292,839 B1 | 9/2001 | Naudus et al. |
| 6,345,303 B1 | 2/2002 | Knauerhase et al. |
| 6,434,134 B1 | 8/2002 | La Porta et al. |
| 6,445,922 B1 | 9/2002 | Hiller |
| 6,452,920 B1 | 9/2002 | Comstock |
| 6,466,964 B1 | 10/2002 | Leung et al. |
| 6,487,605 B1 | 11/2002 | Leung |
| 6,496,505 B2 | 12/2002 | La Porta et al. |
| 6,504,839 B2 | 1/2003 | Valentine et al. |
| 6,505,047 B1 | 1/2003 | Palkisto |
| 6,510,144 B1* | 1/2003 | Dommety et al. ............ 370/328 |
| 6,519,254 B1 | 2/2003 | Chuah et al. |
| 6,567,416 B1 | 5/2003 | Chuah |
| 6,567,664 B1 | 5/2003 | Bergenwall et al. |
| 6,571,289 B1 | 5/2003 | Montenegro |
| 6,628,943 B1 | 9/2003 | Agrawal et al. |
| 6,647,001 B1 | 11/2003 | Bhagavath et al. |
| 6,684,256 B1 | 1/2004 | Warrier et al. |
| 6,684,331 B1 | 1/2004 | Srivastava |
| 6,690,659 B1 | 2/2004 | Ahmed et al. |
| 6,707,809 B1 | 3/2004 | Warrier et al. |
| 6,711,147 B1 | 3/2004 | Barnes et al. |
| 6,763,007 B1 | 7/2004 | La Porta et al. |
| 6,785,256 B2 | 8/2004 | O'Neill |
| 6,816,912 B1 | 11/2004 | Borella et al. |
| 6,839,337 B2 | 1/2005 | Newberg et al. |
| 6,856,624 B2 | 2/2005 | Margret |
| 6,876,639 B1* | 4/2005 | Cao ............................... 370/331 |
| 6,889,321 B1 | 5/2005 | Kung et al. |
| 6,892,069 B1* | 5/2005 | Flynn ........................ 455/432.1 |
| 6,915,325 B1 | 7/2005 | Lee et al. |
| 6,937,590 B2 | 8/2005 | Lee |
| 6,944,777 B1 | 9/2005 | Belani et al. |
| 6,954,442 B2 | 10/2005 | Tsirtsis et al. |
| 6,970,445 B2 | 11/2005 | O'Neill et al. |
| 6,980,802 B2 | 12/2005 | Jung |
| 6,987,743 B2 | 1/2006 | Chen et al. |
| 6,992,994 B2 | 1/2006 | Das et al. |
| 6,999,435 B2 | 2/2006 | Perras |
| 7,068,640 B2 | 6/2006 | Kakemizu et al. |
| 7,072,323 B2 | 7/2006 | Roberts et al. |
| 7,075,908 B2* | 7/2006 | Noguchi et al. .............. 370/329 |
| 7,080,151 B1* | 7/2006 | Borella et al. ................ 709/230 |
| 7,103,185 B1 | 9/2006 | Srivastava et al. |
| 7,127,496 B2* | 10/2006 | Isozu et al. .................... 709/217 |
| 7,139,833 B2* | 11/2006 | Heller .......................... 709/238 |
| 7,167,466 B2 | 1/2007 | Chowdhurry et al. |
| 7,342,903 B2 | 3/2008 | O'Neill et al. |
| 7,366,147 B2 | 4/2008 | O'Neill |
| 7,385,957 B2 | 6/2008 | O'Neill |
| 7,607,006 B2 | 10/2009 | Ahuja et al. |
| 7,623,497 B2 | 11/2009 | O'Neill |
| 7,631,021 B2 | 12/2009 | Sarma et al. |
| 7,647,498 B2 | 1/2010 | Brown et al. |
| 7,685,317 B2* | 3/2010 | Iyer .............................. 709/248 |
| 7,937,578 B2 | 5/2011 | O'Neill |
| 2001/0036184 A1 | 11/2001 | Kinoshita et al. |
| 2002/0015396 A1 | 2/2002 | Jung |
| 2002/0055971 A1 | 5/2002 | Shahrier |
| 2002/0068565 A1 | 6/2002 | Purnadi et al. |
| 2002/0114469 A1 | 8/2002 | Faccin et al. |
| 2002/0136226 A1 | 9/2002 | Christoffel et al. |
| 2002/0199102 A1 | 12/2002 | Carman et al. |
| 2003/0051140 A1 | 3/2003 | Buddhikot et al. |
| 2003/0125027 A1 | 7/2003 | Gwon et al. |
| 2003/0182433 A1 | 9/2003 | Kulkarni et al. |
| 2003/0185196 A1 | 10/2003 | Venkitaraman |
| 2003/0224788 A1* | 12/2003 | Leung et al. ................. 455/435.1 |
| 2004/0034776 A1 | 2/2004 | Fernando et al. |
| 2004/0073629 A1 | 4/2004 | Bazot et al. |
| 2004/0120295 A1* | 6/2004 | Liu et al. ....................... 370/338 |
| 2004/0185842 A1 | 9/2004 | Spaur et al. |
| 2004/0196808 A1 | 10/2004 | Chaskar et al. |
| 2004/0236965 A1 | 11/2004 | Krohn |
| 2006/0143453 A1 | 6/2006 | Imamoto et al. |
| 2010/0106970 A1 | 4/2010 | Brown et al. |
| 2012/0099446 A1 | 4/2012 | Su et al. |

FOREIGN PATENT DOCUMENTS

| | | |
|---|---|---|
| JP | 2000196678 | 7/2000 |
| JP | 2002509390 A | 3/2002 |
| JP | 2003209890 | 7/2003 |
| WO | WO-9931846 A1 | 6/1999 |

OTHER PUBLICATIONS

Farid et al., "Mobile IPv4 Traversal Across VPN or NAT and VPN Gateways", Feb. 23, 2002, Intel, http://tools.ietf.org/html/draft-adrangi-mobileip-natypn-traversal-01.*

Baker, F., IETF, "RSVP Management Information Base Using SMIv2," Network Working Group, Request for Comments: 2206, pp. 1-60 (Sep. 1997).

Berger, L., "RSVP Refresh Overhead Reduction Extensions," IETF Network Working Group, Request for Comments: 2961, pp. 1-32 (Apr. 2001).

Berger, L., et al., "RSVP Extension for IPSEC Data Flows," IETF, Network Working Group, Request for Comments: 2207, pp. 1-14 (Sep. 1997).

Bos, L., et al., A Framework for End-to-End Perceived Quality of Service Negotiation, IETF Internet Draft, draft-bos-mmusicsdpqos-framework-00.txt, pp. 1-22 (Nov. 2001).

Braden, R., "Resource Reservation Protocol (RSVP)—Ver. 1, Message Processing Rules," IETF, Network Working Group, Request for Comments: 2209; pp. 1-24 (Sep. 1997).

Braden, R., "Resource Reservation Protocol (RSVP)—Ver. 1 functional Specification". IETF, Network Working Group, Request for Comments: 2205, pp. 1-105 (Sep. 1997).

Camarillo, P., et al., Integration of Resource Management and SIP, IETF Internet Draft, draft-ietf-sip-manyfolks-resource-04.ps. pp. 1-18. (Feb. 25, 2002).

Campbell, Andrew T., et al., "IP Micro-Mobility Protocols", ACM SIGMOBILE Mobile Computer and Communications Review (MC2R), vol. 4, pp. 34-64, (Oct. 2001).

(56) References Cited

OTHER PUBLICATIONS

Etri, "Source. Specific Multicast (SSM) Explicit Multicast (Xcast)" pp. 1-27 (Copyright 2001 by Etri).
Ho, "Integration AAA with Mobile IPv4", Internet Draft, pp. 1-59. (Apr. 2002).
Johnson, D. et al., "Mobility Support in IPv6", IETF Mobile IP Working Group, Feb. 26, 2003, downloaded from http://www.join,uni-muenster.de on Dec. 29, 2004, pp. 1-158.
Karagiannis, "Mobile IP, State of the Art Report," Ericsson, No. 3/0362-FCP NB 10288 UEN, pp. 1-63, (Jul. 1999).
Li, Yalun "Protocol Architecture for Universal Personal Computing" IEEE Journal on Selected Areas in Communications 15(8); 1467-1476 (1997).
Mankin, A., et al. "Resource ReSerVation Protocol (RSVP) Ver. 1, applicability Statement Some Guidelines on Deployment", IETF, Network Working Group, Request for Comments: 2208, pp. 1-6 (Sep. 1997).
Marshall, W., et al., Integration of Resource Management and SIP, IETF Internet Draft, draft-ietf-sip-manyfolks-resource-02.txt, pp. 1-28 (Aug. 2001).
Moy, J., "OSPF Version 2", Network Group, Request for Comments: 2328, pp. 1-244 (Apr. 1998).
Papalilo, D., et al., "Extending SIP for QoS Support" www.coritel.it/publications/IP_download/papalilo-salsano-veltri.pdf, pp. 1-6. (Dec. 8, 2001).
Perkins, C., "IP Mobility Support", Network Working Group, Reqeuest for Comments: 2002, pp. 1-79 (Oct. 1996).
Perkins, C., "IP Mobility Support for IPv4", Network Working Group, Reqeuest for Comments: 3220 downloaded from http://www.ietf.org pp. 1-92. (Dec. 29, 2004.).
Rosenberg, J., et al., "SIP: Session Initiation Protocol", IETF, Network Working Group, Request for Comments: 3261, pp. 1-269 (printed as pp. 1-252) (Jun. 2002).
Rosenberg, J., et al., "SIP: Session Initiation Protocol", IETF Network Working Group, Request for Comments: 3261, pp. 1-29. (Jun. 2002).
Schulzinne, Henning et al., "Application-Layer Mobility Using SIP", 0-7803-7133 IEEE, pp. 29-36, (Jan. 2000) 0.
Thulasi, Arun et al., Ipv6 Prefix Delegation Using ICMPv6, Network Working Group, pp. 1-33. (Apr. 2004).
TIE/EIA/IS-707A.8 "Data Service Options for Spread Spectrum Systems: Radio Link Protocol Type 2", pp. 1-1:4:12 (Mar. 1999).
Valko, Andras, "Cellular IP: A New Approach to Internet Host Mobility" Computer Communications Review 29(1): pp. 50-65 (1999).
Wedlund, Elin et al., "Mobility Support Using SIP", Proc. of ACM/IEEE International Conference on Wireless and Mobile Multimedia (WoWMoM'99), Seattle Washington, (Aug. 1999).
Wroclawski. J., "The Use of RSVP with IETF Integrated Services," IETF, Network Working Group, Request for Comments: 2210, pp. 1-31 (Sep. 1997).
Zhou S., et al., "A Location Management Scheme for Support Mobility in Wireless IP Networks Using Session Initiation Protocol (SIP)", 1531-2216/01 IEEE, pp. 486-491 (Oct. 2001).
International Search Report—PCT/US03/11472, International Search Authority, European Patent Office, Jul. 15, 2003.
International Search Report—PCT/US03/011619, International Search Authority, US, Jul. 15, 2003.

* cited by examiner

METHODS AND APPARATUS FOR EXTENDING MOBILE IP

RELATED APPLICATIONS

This application is a continuation of U.S. patent application Ser. No. 10/425,151 filed Apr. 29, 2003, titled, "Method and Apparatus for Extending Mobile IP," which claims the benefit of the filing date of U.S. Provisional Patent Application 60/465,510 filed Apr. 25, 2003, titled "Methods And Apparatus For Extending Mobile IP," and also of the filing date of U.S. Provisional Patent Application Ser. No. 60/426,332 filed Nov. 14, 2002, and is a continuation-in-part of U.S. patent application Ser. No. 10/413,888, filed on Apr. 14, 2003, titled "METHODS AND APPARATUS FOR TUNNELING BETWEEN DIFFERENT ADDRESSING DOMAINS" now U.S. Pat. No. 7,366,147, which claims the benefit of the filing date of U.S. Provisional Patent Application 60/372,655 filed Apr. 15, 2002 titled "Communications Methods and Apparatus", all are hereby expressly incorporated by reference.

BACKGROUND

1. Field

The present application relates to communications methods and, more particularly, to methods and apparatus for extending mobile IP to support proxy mobile node servers and to using such servers to act as mobile node proxies with regard to one or more existing applications

2. Background

Mobile IP (v4/v6), also indicated as MIPv4 and MIPv6 enables a mobile node (MN) to register its temporary location indicated by a care-of-address (CoA) to its Home Agent (HA). MIPv4 is described at http://www.ietf.org/rfc/rfc3220.txt MIPv6 is described in http://www.ietf.org/internet-drafts/draft-ietf-mobileip-ipv6-21.txt. In MIP the HA then keeps a mapping (also called a binding) between the MN's permanent address, otherwise called Home Address (HoA), and the registered CoA so that packets for that MN can be redirected to its current location using IP encapsulation techniques (tunneling).

The CoA used by a MN can be an address that belongs to a Foreign Agent (FA) when MIPv4 is used or, in MIPv4 and MIPv6, it can be a temporarily allocated address to the MN itself in which case is called a collocated care-of-address (CCoA).

The concepts and solutions described here are applicable to both MIPv4 and MIP unless otherwise mentioned.

MIPv4/v6 also has a feature called reverse tunneling. This ensures that all uplink traffic from the MN goes via the HA before its final destination. The traffic is essentially tunnelled back to the HA either by the MN itself or by the FA the MN is connected to. Similarly as before, the HA will not accept reverse tunnelled packets from a given CoA or CCoA unless the MN registers that CoA/CCoA with it.

In Mobile IP the home subnet is the location of the HA and is also where the MN is typically located. When a MN is on its home subnet, the MN responds to Address Resolution Protocol (ARP) requests for the HoA. When it is away from home, the HA instead uses proxy ARP to respond to ARP requests for the HoA of the MN so that packets for the MN are routed towards and by the HA towards the current CoA. When a MN returns home, the HA and the MN send gratuitous ARP signals to update all the ARP caches to inform them that the MN is now home and that the link-layer address for the HoA is now that of the MN and not the HA. If the MN is not at home, and the HA does not have a current CoA binding for the MN, then both the HA and the absent MN will ignore incoming packets which will blindly be dropped on the subnet. The AR processing is described in section 4.6 of IETF RFC 3220. In mobility systems, such as in 3G cellular or 802.11, especially when dynamic addressing is employed, the MN typically does not have a home subnet and there is never a MN available to respond to ARP requests in the absence of a current CoA binding in the HoA, maintained by the MN.

Additionally, in mobility systems, the MN may be absent from the system for a number of reasons. The MN could be switched off, unreachable in a disconnected part of the Internet fabric (a private domain), it could be in various forms of power-saving sleep states, or could simply not wish to be reachable on a specific HoA (privacy, on-leave etc). Therefore, when the MN is absent and not maintaining its CoA binding, incoming packets for that HoA will simply be dropped on the local subnet.

SUMMARY

The methods and apparatus of the present invention allow a server, referred to as a proxy MN server, to act as a proxy for an MN with regard to one or more active applications when the MN is unavailable, e.g., in sleep mode, otherwise absent, or unreachable. Thus, applications which might time out due to a lack of signals from an MN may be maintained even while the MN is absent. This allows the MN to continue interacting with an application when it returns, e.g., awakens from a sleep mode of operation.

One feature of the invention is to provide an additional layer of processing in an HA to enable the HA and a proxy MN server of the invention to process incoming packets for HoAs that do not have a currently maintained binding by the MN. In known processing the HA stops issuing proxy ARPs for the HoA when the CoA binding from the MN ceases, and signals this by issuing a gratuitous ARP on the home subnet for the HoA. If the MN is absent from the subnet then any incoming packets towards the HoA will be lost in the known systems. To avoid this unfortunate result we define a proxy MN server that reacts to hearing the HA gratuitous ARP (that cancels the ARP binding between the HA and the HoA), by itself issuing gratuitous ARPs to redirect HoA addressed packets to itself. In some embodiments, the proxy MN server of the present invention does this in cases where the MN can not itself be on the home subnet and not in other cases thereby avoiding the situation of both the MN and the proxy MN server issuing competing gratuitous ARPs, and subsequent ARPs for the HoA. If they can both be on the home subnet at the same time, then various techniques can be used to resolve who is the receiver of the packets. These techniques can also be used to give the MN explicit control over when packets are forwarded to the proxy MN server.

1) Both the MN and the proxy MN server could, and in some embodiments does, issue gratuitous ARPs but with different priorities such that the MN will win if present on the subnet, causing the proxy server to cease proxy ARP whilst it sees ARPs from the MN.
2) Before the MN binding is lost in the HA, the MN could, and in some embodiments does, issue a signal to the proxy MN server explicitly requesting it to act on the MNs behalf wrt ARPs.
3) A HA could, and in some embodiments does, have a default CoA installed for the MN such that whilst the MN has no active binding, packets are instead forwarded to the default CoA which points to the location of the proxy MN server. This has the additional benefit of explicitly removing the ARP context between the MN and the proxy MN server, and enables the proxy MN server to be located off the home subnet, on any foreign subnet, and specifically behind a firewall in the operator web-farm and/or operations centre.

4) The MIP could, and in some embodiments does, also use a MIP hand-off to specifically inform the HA to install a long lifetime binding that points to the default CoA which is either a CCoA of the proxy MN server, or a FA CoA of a router in front of the proxy MN server, whilst the MN is away. The MIP signalling looks like a forward (proactive) hand-off towards the proxy MN server CoA and has the advantage of giving the MN specific feedback from the HA (MIP Reply) and the proxy MN server (via BU/Buack) about the progress of the hand-off. Alternatively, the MN can request that the MNPS issues a reactive hand-off to transfer forwarding towards the MNPS CoA in the HA, a binding which is maintained by the MNPS. In addition, the MN can transfer layer 2 and IP layer state to the proxy MN server using Context transfer mechanisms to assist that server in processing the incoming traffic, and to act as a storage point for MN state. Application state can also be sent between the MN and the MNPS.

Reviewing the forwarding rules, for the above, the HA first forwards to the current MN managed binding and next to any binding managed by the MNPS. Failing that, it forwards to any default CoA for the MN. Failing that, the HA issues a gratuitous ARP to release the ARP binding and the proxy MN server issues a gratuitous ARP to claim the packets for that MN. If the MN is also on the home subnet then the ARP from the MN over-rules the ARP from the proxy MN server and also suppresses the proxy MN server using a suppression timer (similar concept to that in IGMP).

When the MN wishes to reclaim forwarding from the proxy MN server, it can either issue a gratuitous ARP on the home subnet, or install a binding into the HA to cancel the default CoA, or request the MNPS to release its binding and redirect forwarding the MN. Note that it should also be possible for the MN to be able to issue a 'cancel all bindings message' to the HA to cause the HA to stop forwarding to the proxy MN server, when the MN is able to also install forwarding to the default CoA (i.e., when it is not a true default, but a signalled optional CoA). For all CoAs, a filter can be installed into the HA so that only a subset of packets are redirected to the MNPS rather than all packets, such that remaining packets are then delivered to the MN.

Packets for the MN are forwarded to the proxy MN server in the absence of the MN where various applications can be deployed of benefit to the operator and the MN. These applications include, for example:

1) Fault management. Packets arriving at a HA with no current CoA binding from the MN indicates a potential error in the system. Rather than simply dropping and losing the packet, forwarding them to the proxy MN server enables a record of the packet headers to be taken so that they can be correlated with other records to identify what went wrong in the system.
2) Paging. Whilst the MN is sleeping, incoming packets are forwarded to the proxy MN server where a paging classifier is interrogated and a decision is made as to whether or not to page the MN given the packet details, e.g., data contents. The paging system can then be used to locate the MN. Once located and contacted by the paging system the proxy MN server hands-off to the MN which appears to the system in terms of MIP signalling as if the MN actually moved from the proxy to the present FA. During this hand-off, the BU from the MN can be used to cause forwarding of packets at the proxy MN server through to the MN, and Context transfer can be used to transfer locally stored MN state, e.g., current application and MN related communication information, from the proxy MN server back to the FA and the MN so that the MNs state accurately reflects the status at the point the proxy MN server transferred application responsibility back to the MN.
3) Application proxies. The proxy MN server can be statically configured, or dynamically programmed by the MN, with information about application processing that the proxy can undertake for the MN whilst it is away. This is useful for a number of reasons. Firstly, a number of Internet applications issue keep-alives and need responses from the MN to remain active. The MN would therefore have the choice of either being prevented from moving into power efficient sleep state for longer than the keep-alive timers, or it would have to lose application liveness. The proxy MN server eliminates this problem because it can instead act on the MNs behalf in a controlled manner, to respond to selected keep-alives whilst the MN is sleeping (for IPSEC, VPN apps, mail servers, the MIP default CoA registration, SIP servers, streaming servers, multicast group memberships etc). Secondly, the MN can order processes to complete e.g., via interaction with the proxy MN server, whilst it is sleeping/missing. Such processes include content distribution (web-pages, files, video streams, software etc), mail uploads and downloads and in fact any application flow that could be more quickly routed through the proxy than directed to or from the MN, or that enables the MN to sleep and hence download content using bursty airlink opportunities. The proxy MN server could then optionally page the MN to inform it that the process has completed. The MN can then wake-up and rapidly download the content from the proxy or receive the delivery notification confirmation. For such application control, the proxy MN server may utilize an application proxy for each such application (web caches and content distribution mechanisms already exist) and signalling systems to control what processes those proxies keep-alive and/or complete in its absence, and the action to undertake when the process terminates (or keep-alive fails). Exemplary actions include paging the MN, store and forward, store until the MN wakes up and triggers the queries the application proxy cache. A range of other triggers and applications activities can be imagined within this general framework.

The MNPS will generally need to have a security association with the MN, and with the peer systems of the MN to be able to secure the MIP signalling and the signalling packet flows with peers of the MN as described in this invention.

Numerous additional features, benefits and exemplary embodiments are described in the detailed description which follows.

DETAILED DESCRIPTION

Figure 1:
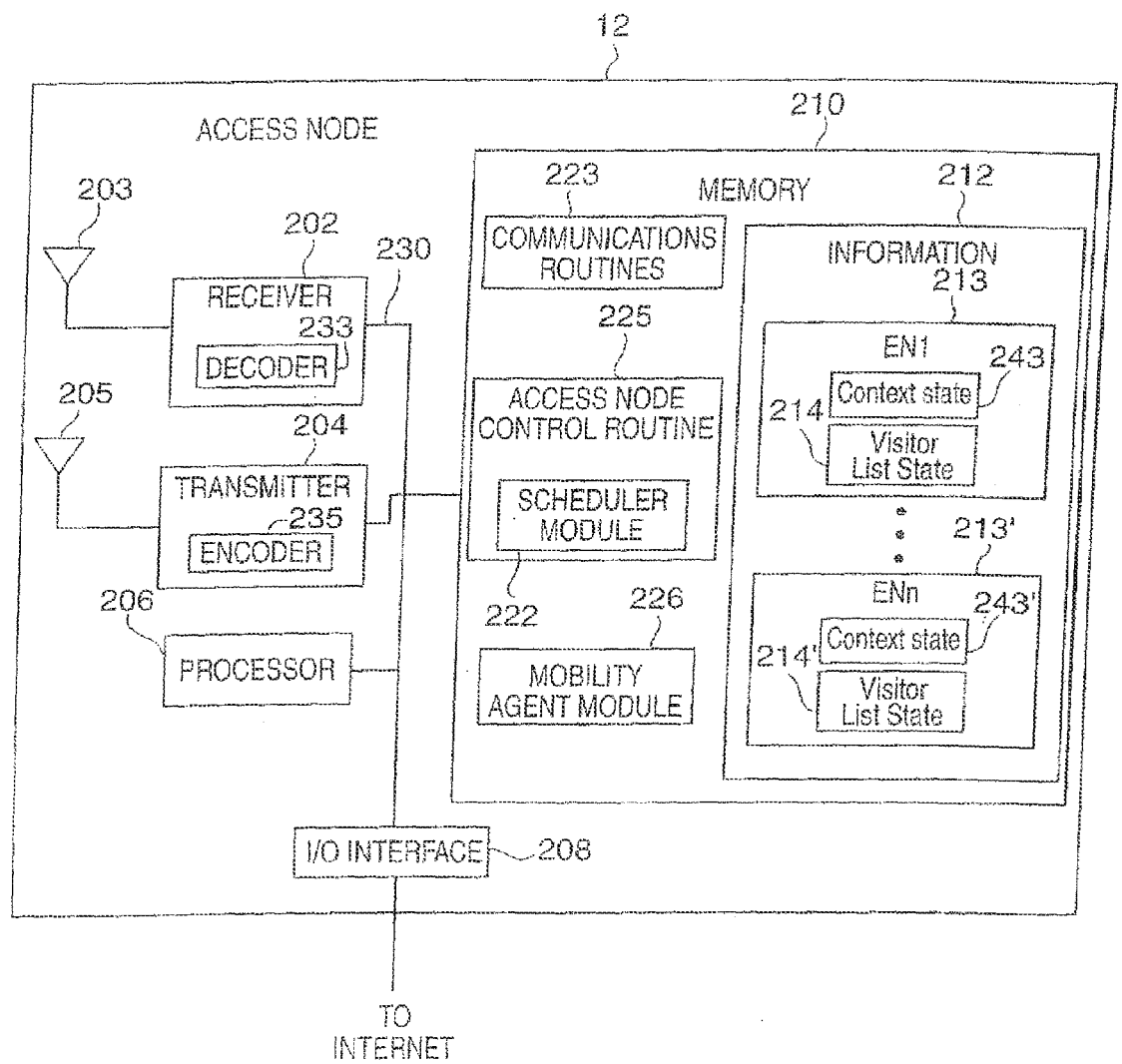
FIG. 1 illustrates an exemplary access node implemented in accordance with the present invention.

FIG. 1 illustrates an exemplary access node 12, e.g., access router or base station, implemented in accordance with the invention. The access node 12 includes antennas 203, 205 and corresponding receiver, transmitter circuitry 202, 204, respectively. The receiver circuitry 202 includes a decoder 233 while the transmitter circuitry 204 includes an encoder 235. The circuitry 202, 204 is coupled by a bus 230 to an I/O interface 208, a processor (e.g., CPU) 206 and memory 210. The I/O interface 208 couples the access mode 12, e.g., base station, to the Internet. The memory 210 includes routines, which when executed by the processor 206, cause the access node 12 to operate in accordance with the invention. Memory includes communications routines 223 used for controlling the access node 12 to perform various communications operations and implement various communications protocols. The memory 210 also includes an access node control routine 225 used to control the access node's 12, e.g. base station's, operation and signaling to implement the steps of the method of the present invention. The access node control routine 225 includes a scheduler module 222 used to control transmission scheduling and/or communication resource allocation. Thus, module 222 may serve as a scheduler. The memory 210 also includes a mobility agent module 226 used to process and send mobility related signaling implementing the steps of the method of the present invention. Thus, module 226 may serve as a Mobile IPv4 Foreign Agent or a Mobile IPv6 Attendant. Memory 210 also includes information 212 used by communications routines 223, control routine 225 and mobility agent module 226. The information 212 includes an entry 213, 213' for each active end node (EN1, ENn, respectively), which includes the context state 243, 243' at the access node associated with each end node (EN1, ENn), said context state being passed between access nodes during hand-off of the end node, and including such information as the end node profile, security associations, and end node multicast membership. Entry 213,213' also includes MIP visitor list state 214, 214' associated with said end node (EN1, ENn), respectively, at that access node. In particular, information for end node 1 213 includes context state 243 for end node 1 213, and includes MIP visitor list state 214, shown in detail in FIG. 4.

Figure 2:
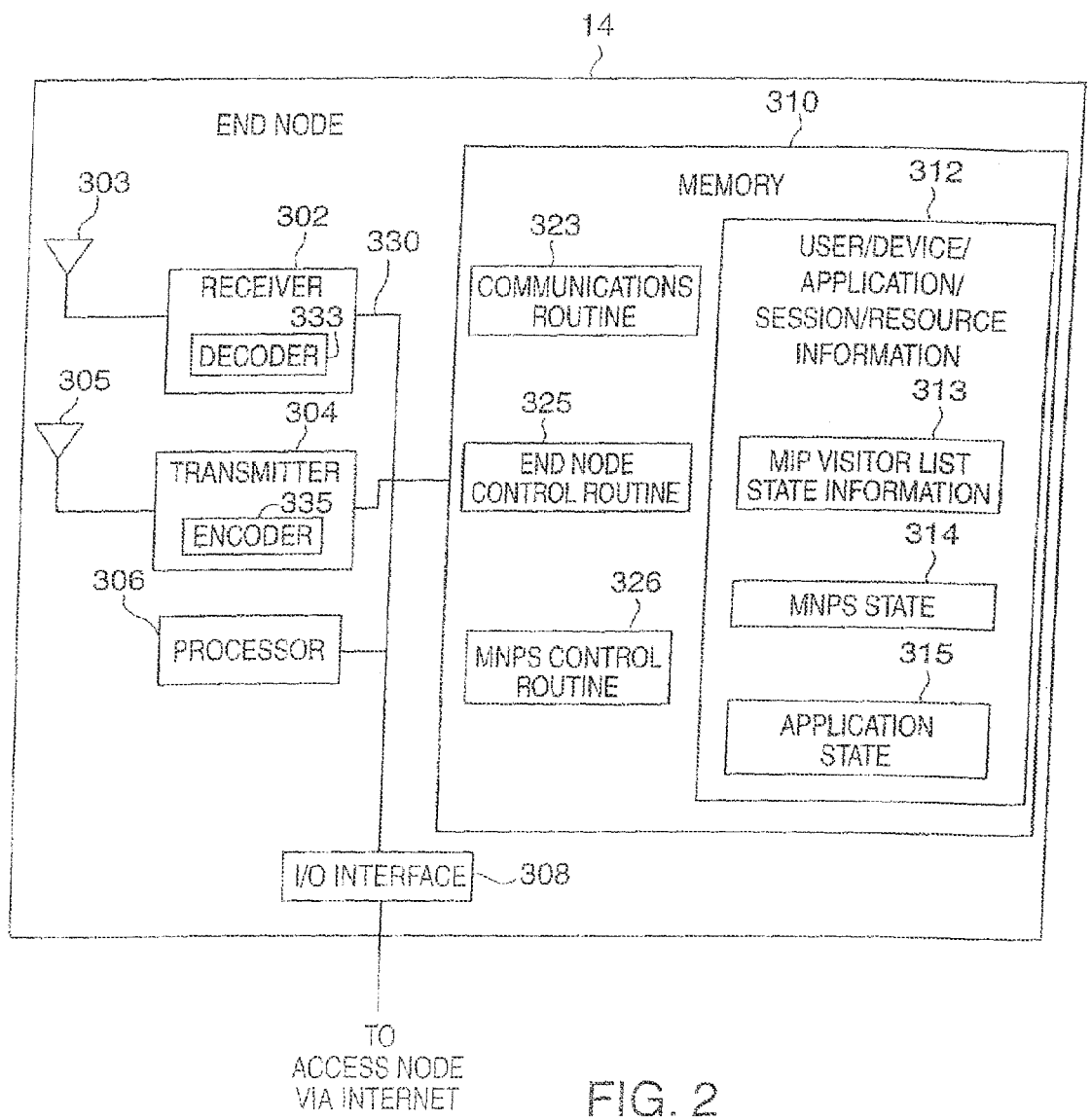
FIG. 2 illustrates an exemplary end node implemented in accordance with the present invention.

FIG. 2 illustrates an exemplary end node 14 implemented in accordance with the present invention. The end node 14 may be used by a user as a mobile terminal (MT) or the end node can act as the Mobile Node proxy Server (MNPS) for a mobile terminal (MT). The end node 14 includes receiver and transmitter antennas 303, 305 which are coupled to receiver and transmitter circuitry 302, 304 respectively, when the end node is connected to the access node 12 via a wireless link. The receiver circuitry 302 includes a decoder 333 while the transmitter circuitry 304 includes an encoder 335. The receiver transmitter circuits 302, 304 are coupled by a bus 330 to a memory 310, a processor 306, and an I/O interface 308. When the end node 14 is connected to the access node via a fixed link then the I/O interface 308 is employed. Processor 306, under control of one or more routines stored in memory 310, causes the end node 14 to operate in accordance with the methods of the present invention. In order to control operation of the end node 14, memory 310 includes communications routine 323 and end node control routine 325. The end node communications routine 323 is used for controlling the end node 14 to perform various communications operations and implement various communications protocols. The end node control routine 325 is responsible for insuring that the end node operates in accordance with the methods of the present invention and performs the steps described in regard to end node operations and signaling. Memory 310 also includes a MNPS control routine 326. The MNPS control routine 326 is responsible for insuring that the end node operates in accordance with the methods of the present invention and performs the steps described in regard to MNPS operations and signaling. The memory 310 also includes user/device/application/session /resource information 312 which may be accessed and used to implement the methods of the present invention and/or data structures used to implement the invention. In particular, User/Device/Application/Session/Resource information 312 includes MIP visitor state information 313 described in detail in FIG. 4. Information 312 also includes MNPS state 314 that includes addresses of the MNPS when the end node is a MT, or a home address of the MT when the end node 14 is a MNPS, associated security association for securing signaling between the MT and its MNPS, and state indicating whether the MT or the MNPS is presently receiving/sending packets from/to the home address of the end node 14. Information 312 also includes application state 315 that describes the intended behavior of the application software on the MT 14 and the MNPS 14, the application state that is sent from the MT 14 to the MNPS 14, and the classifier information that is sent to a home agent that describes which packet flows are directed to the MT 14 and which flows are sent to the MNPS 14 for the MT 14.

Figure 3:
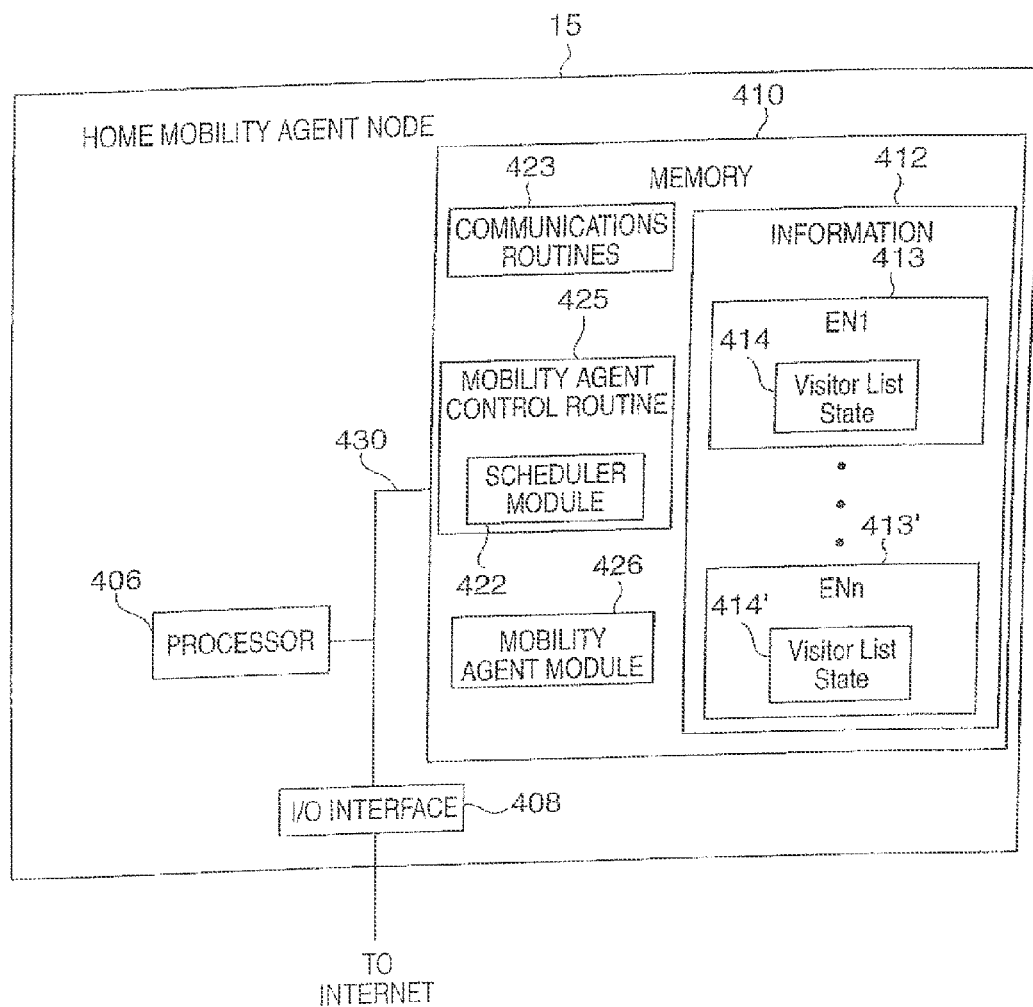
FIG. 3 illustrates an exemplary home mobility agent node implemented in accordance with the present invention.

FIG. 3 illustrates an exemplary home mobility agent node 15 implemented in accordance with the invention. The home mobility agent node 15 includes a bus 430 that couples together an I/O interface 408, a processor (e.g., CPU) 406 and memory 410. The I/O interface 408 couples the home mobility agent node 15 to the Internet. The memory 410 includes routines, which when executed by the processor 406, cause the home mobility agent node 15 to operate in accordance with the invention. Memory 410 includes communications routines 423 used for controlling the mobility agent node 15 to perform various communications operations and implement various communications protocols. The memory 410 also includes a mobility agent control routine 425 used to control the mobility agent node's 15 operation and signaling to implement the steps of the method of the present invention. The mobility agent node control routine 425 includes a scheduler module 422 used to control transmission scheduling and/or communication resource allocation. Thus, module 422 may serve as a scheduler. The memory 410 also includes a mobility agent module 426 used to process and send mobility related signaling implementing the steps of the method of the present invention. Thus, module 426 may serve as a Mobile IP Home Agent. Memory 410 also includes information 412 used by communications routines 423, control routine 425 and mobility agent module 426. The information 412 includes an entry 413, 413' for each active end node (EN1, ENn), respectively. In particular, information for end node 1 413 includes visitor list state 414, shown in detail in FIG. 4. Information about end node N 413' includes visitor list state 414' also shown in detail in FIG. 4.

Figure 4:
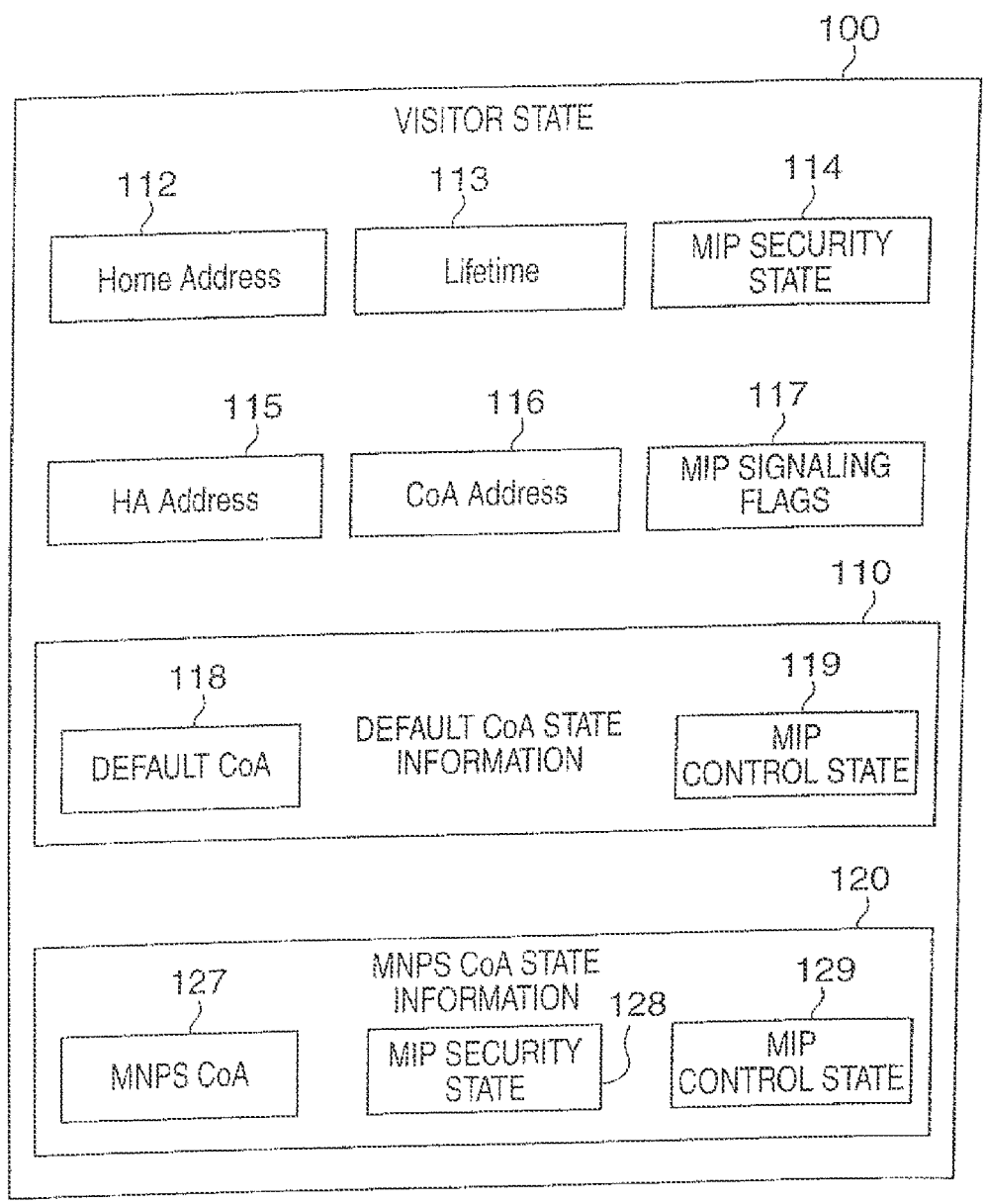
FIG. 4 illustrates the exemplary contents of visitor list state which is exemplary of state that may be included in the visitor list state shown in any one of FIGS. 1, 2 and 3.

FIG. 4 illustrates example visitor list state 100, associated with a given mobility agent such as an end node 14, access node (foreign agent) 12, or a home mobility agent node (home agent) 15, implementing list state 313 in FIG. 2, the visitor list state 214, 214' in FIG. 1, and visitor list state 414,414' in FIG. 3, respectively. From the perspective of the access node 12 and the end node 14 of FIGS. 1 and 2 respectively visitor list state 100 may include a number of state entries 110, 120.

According to this invention Visitor state 100 includes entries for at least one MN 14, each entry including state for a MN home address (HoA) 112, a Home Agent (HA) address 115, a Care of Address (CoA) 116, a binding lifetime 113, MIP signaling flags 117 and MIP security state associations 114 applicable to that mobility agent. When the mobility agent is a home mobility agent then the visitor list state information 100 further includes default CoA state information 110 including the default CoA 118 for an end node 1, e.g., mobile node (MN) or mobile terminal (MT), to be employed by the home agent 15 when the visitor list does not have a valid CoA 116 for the home address 112. Default CoA state information 110 also includes MIP Control State 119 used in the operation of MIP signaling and forwarding between the end node 14 and the home agent node 15. Additionally, when the mobility agent is a home mobility agent then the visitor list state information 100 includes MNPS CoA State information 120 for a home address 112 to be employed by the home agent node 15 when the visitor list is maintained by the corresponding MNPS of a end node 1, rather than the end node 1, e.g. MT, itself MNPS CoA state 120 includes the MNPS CoA 127 that is employed instead of the default CoA 118 or the end node 1 CoA 116 when the MNPS is issuing MIP registrations to the home agent node 15. State 120 further includes MIP security state 128 to secure such registrations at the home agent, and MIP control state 129 used for the operation of MIP signaling and forwarding between the MNPS 14 and the home agent 15.

Figure 5:
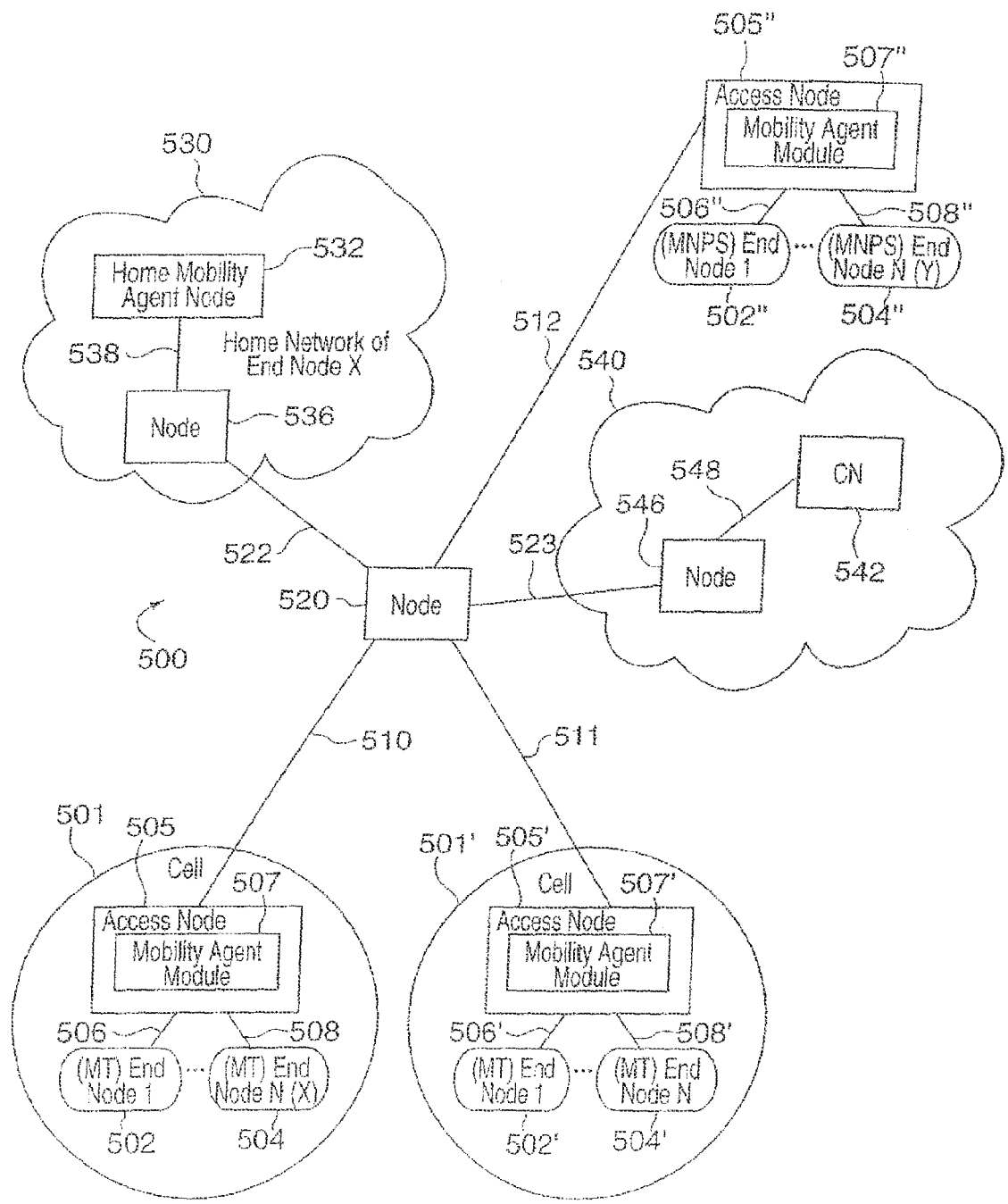
FIG. 5 illustrates a network diagram of an exemplary communications system in which the invention is applicable.

FIG. 5 illustrates an exemplary system 500 comprising a plurality of access nodes 505, 505', 505" implemented in accordance with the present invention. FIG. 5 also depicts communication cells 501, 501', surrounding each access node 505, 505', respectively, which represents the coverage area of the radio technology employed by corresponding access node 505, 505', respectively with end nodes. Access node 505" in contrast employs fixed links to end nodes and hence does not employ a communications cell but is otherwise part of the network. The same physical and functional elements are otherwise depicted in each of the communication cells 501, 501', and the network thus the following description of the elements in the cell 501 surrounding access node 505 is directly applicable to each of the cells 501, 501', and the network portion containing the access node 505". The depiction of the access node 505 is a simplified representation of the access node 12 depicted in FIG. 1. For simplicity access node 505 is shown to include a mobility agent module 507 responsible for the signaling implementing this present invention. FIG. 5 illustrates the access node 505 providing connectivity to a plurality of N end nodes 502, 504 (End Node (MT) 1, End Node (MT) N (X)), via corresponding access link 506, 508, respectively. End nodes 502, 504 are simplified versions of the end node 14 depicted in FIG. 2.

Interconnectivity between the access nodes 505, 505', 505" is provided through network links 510, 511, 512 and an intermediate network node 520. Home network 530 in FIG. 5 is connected to the rest of the system via link 522 and node 520. Home Network 530 further includes network node 536 also connected to link 522 and mobility agent node 532, connected to node 536 via link 538 and operating as mobility agent of at least end node N 504. Network 540 in FIG. 5 is connected to the rest of the system via link 523 and node 520. Network 540 further includes network node 546 also connected to link 523 and a correspondence node (CN) 542, connected to node 546 via link 548 and operating as corresponding node in a data session with at least end node N 504 for illustration of the methods of this present invention. Access Node 505 is considered to support mobile terminals (MTs) in the communications network 500 providing wireless communications, e.g., via links (506, 508) with end nodes (end node (MT) 1 502, end node (MT) N (X) 504). Similarly, access node 505' is considered to support MTs in the communications network 500 providing wireless communications, e.g., via links (506', 508') with end nodes (end node (MT) 1 502', end node (MT) N 504'). In contrast, the access node 505" is considered to support fixed links to end nodes that are MNPSs which further support the end nodes that are MTs in the communications system 500. Access node 505" is shown to be coupled via fixed links (506", 508") to end nodes (end node (MNPS) 1 502", end node (MNPS) N (Y) 504"), respectively.

Figure 6:
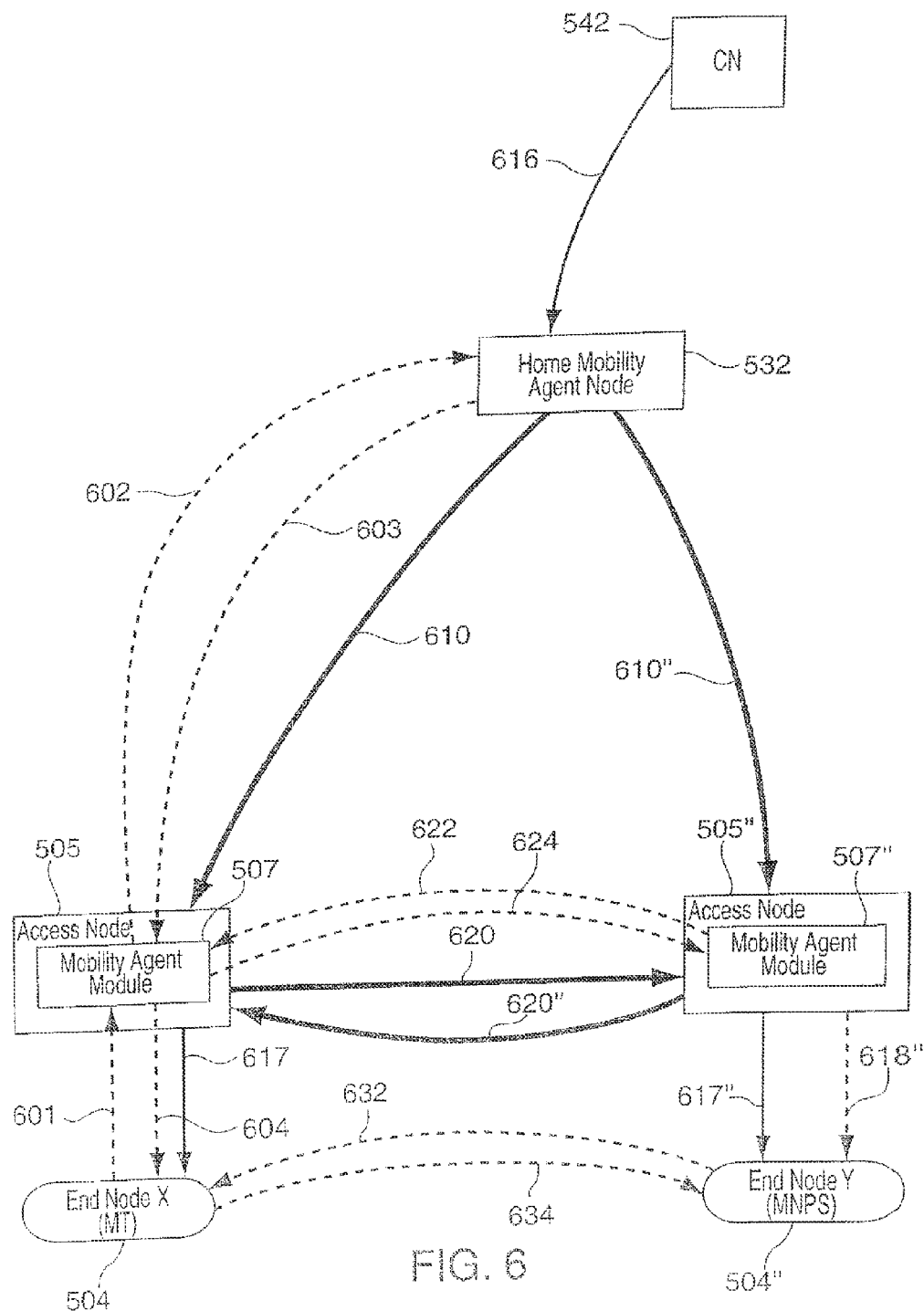
FIG. 6 illustrates exemplary signalling and packet flows for the network of FIG. 5.
Figure 7:
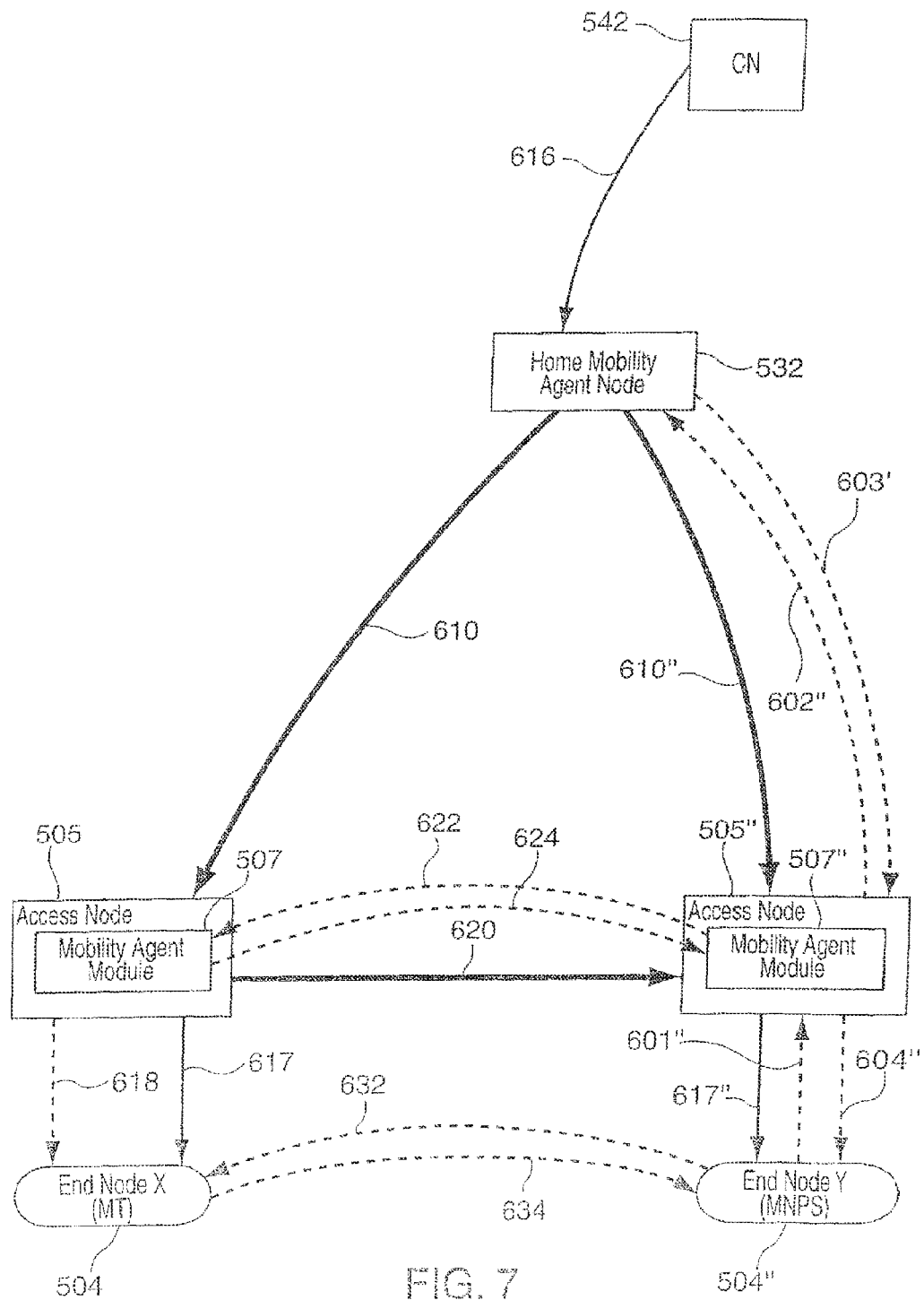
FIG. 7 illustrates a second exemplary signalling and packet flows for the network of FIG. 5.
Figure 8:
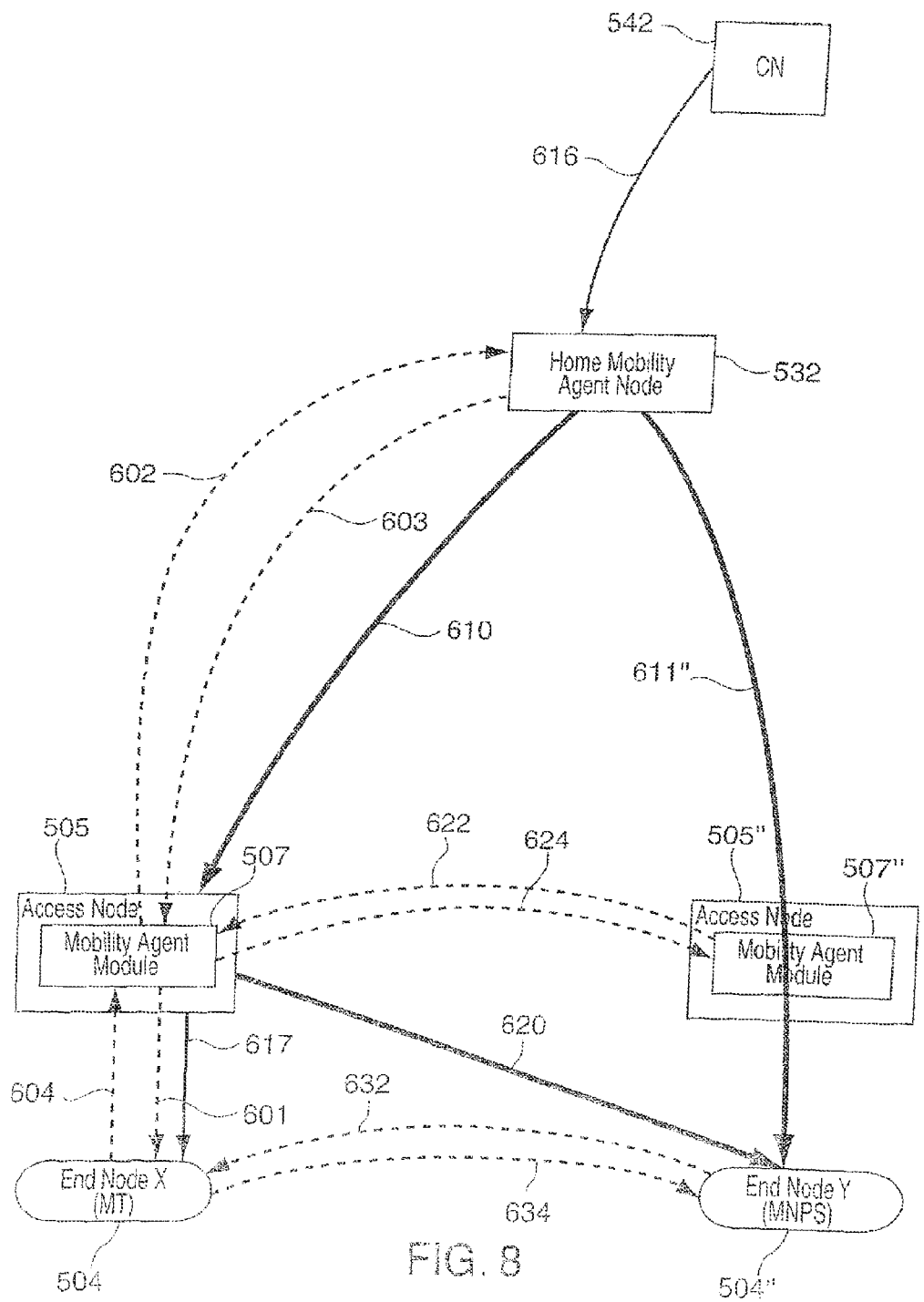
FIG. 8 illustrates another exemplary signalling and packet flows for the network of FIG. 5.

FIGS. 6-8 illustrate example embodiments of the various methods of this present invention. FIGS. 6-8 are simplified versions of the system FIG. 5 including elements as required to further explain this present invention. FIG. 6 shows access nodes 505, 505", including mobility agent modules 507, 507", respectively, providing access to MT end node X 504, and MNPS end node Y 504" that provides functionality to the MT end node X 504. FIG. 6 also shows home mobility agent node 532 serving end node (MT) X 504 and a CN node 542 being in a communication session with said end node (MT) X 504. In FIG. 6 solid thin arrows depict inner data traffic and the direction of the arrow points to the destination of said data traffic; thick solid lines depict encapsulated inner data traffic and the direction of the arrow points to the destination of said tunnel; dashed lines depict signaling messages used for the registration of an end node to the foreign mobility agent 507 and the home mobility agent 532, and the direction of the arrow points to the destination of said signaling. Dashed lines are also used for other types of signaling associated with MIP hand-off and with controlling the MNPS functionality.

FIG. 6 shows the packet forwarding and signaling for an exemplary example of the invention in operation in network 500. The dashed arrows indicate signaling messages and the solid arrows are packet flows. The thin solid arrows are inner packets whilst the thick arrows are encapsulated inner packets using an outer header. In FIG. 6, end node (MT) X 504 is initially receiving packets from the CN 542 as packet flow 616 to the home mobility agent node 532, which tunnels these packets to the access node 505 as packet flow 610, and then the foreign agent 507 in the access node 505 then decapsulates the packets 610 and forwards them as packets 617 to the end node (MT) X 504. When the end node (MT) X 504 wishes to invoke the MNPS functionality of the invention, then the end node (MT) X 504 sends registration request signals 601, 602 towards the home mobility agent 532, via the foreign agent 507 and receives the registration reply via messages 603 and 604. The registration message 601 includes the home address of the end node (MT) X 504, the address of the mobility agent node 532, the address of the access node 505, the end node X CoA field for the home address of the end node (MT) X 504, and the requested lifetime of the registration. The registration message is intended to cancel the binding between the home address and the CoA of the end node (MT) X 504 in the foreign and home agents 507,532. To achieve this, without loss of generality, the CoA may be set equal to the home address and/or the lifetime is set to zero or a very short time value. When the dynamic binding between the home address and dynamic CoA is cancelled or replaced by the end node (MT) X 504 in the home agent 532, then the home agent replaces the dynamic CoA entry with the default CoA entry in the binding. The default CoA is either preconfigured into the home agent via a management process, can be delivered in the MN profile from a policy server, or can be dynamically configured by the end node (MT) X 504 by including a default CoA in this or a previous registration message. The default CoA is permanent and is only removed from the home agent mobility node 532 when the default CoA functionality is no longer applicable such as when the home address is no longer allocated to end node (MT) X 504. The home agent 532 then tunnels packets that arrive for the home address of end node (MT) X 504 to the default CoA of end node (MNPS) Y 504" rather than to the dynamic CoA of the end node (MT) X 504. The default CoA in FIG. 6 is the address of the agent node 505" to which the end node (MNPS) Y 504" is connected. End node (MNPS) Y 504" is the MNPS of the end node (MT) X 504 such that packets addressed to the home address of the end node (MT) X 504 are now delivered to end node (MNPS) Y 504" where the application proxy for that end node (MT) X 504 is located. The forwarding at the access node 505" is preconfigured with a binding between the home address of the end node (MT) X 504 and the end node (MNPS) Y 504" so that the access node 505" can decapsulate the packets from the home agent 532 and forward them as packets 617" to the end node (MNPS) Y 504". The end node (MNPS) Y 504" becomes the network end point for packets 617 addressed to the home address of the end node (MT) X 504 whilst the default CoA is active at the home agent 532.

In a further embodiment, the home mobility agent node 532, foreign mobility agent 507", end node (MNPS) Y 504" or any intermediate node that is on the path of the packet flow between the home agent 532 and the end node (MNPS) Y 504", can act as a Network translator and convert the destination address of the packets in the packet flow from the home address of the end node (MT) X 504 to the interface address of the end node (MNPS) Y 504" so that the end node (MNPS) Y 504" application proxy can avoid re-using the home address of the end node (MT) X 504 as a network address.

These features of the invention enable an end node (MT) X 504 to redirect its packets to an end node (MNPS) Y 504" under the control of the end node (MT) X 504 and its home agent 532.

The end node (MNPS) Y 504" receives the packets 617" and undertakes the processing of the packets and the application data within the packets, as if it was the end node (MT) X 504. The end node (MNPS) Y 504" has an interface that matches the destination address of packets 617" and passes the application data contained in the packets to the application software in the application proxy that is configured to process said packet data. The processing of the packet data is controlled by application proxy configuration state which enables the MNPS at end node Y (MNPS) 504" to provide services on behalf of the MN in the end node (MT) X 504 to CN 542. These services include the ability to generate application data, create packets and send said packets to the CN 542 as part of the ongoing communications session, or to any other end node including the end node (MT) X 504. In addition, the application proxy is able to send and receive signaling data in signaling packets that can be used to create, maintain and terminate communications sessions with CNs.

Signaling or application data packets generated by the end node (MNPS) Y 504", on behalf of the end node (MT) X 504, as part of the session with the CN 542, are typically returned to the CN 542 using the reverse path and associated processing through the foreign agent 507" and Home agent 532.

Where alternative nodes other than the home agent 532 have the dynamic CoA state, such as is the case with the CN 542 when employing Mobile IP Route optimization (http://www.ietf.org/proceedings/99nov/I-D/draft-ietf-mobileip-optim-08.txt), then the CN 542 may additionally have the default CoA state described in this invention.

In a further embodiment of the invention, the home agent 532 can have a filter associated with the default CoA for a home address of an end node (MT) X 504 that identifies a specific subset of packets addressed to that home address that are to be forwarded to the default CoA when a dynamic CoA is not active. The application proxy at the end node (MNPS) Y 504" therefore only needs to be able to provide applications services for said subset of packets rather than for all possible applications employed by the end node (MT) X 504. The filter can be configured or delivered using any of the methods employed for the default CoA. Similarly, the application proxy configuration can include filters that limit the type of applications packets can be emitted by the application proxy from the source address of the end node (MT) X 504, or any associated source address that is translated into the home address of the end node (MT) X 504. Further, a filter can alternatively be installed into the foreign agent 507" to police packet flows in either direction between the CN 542 and the end node (MNPS) Y 504".

In a further embodiment of the invention, the message 601 can include the address of the access node 505" and an instruction to trigger message 624 and acknowledgment 622 which causes the context state associated with the end node (MT) X 504 at the access node 505 to be transferred to the access node 505" so that the access node 505" can police and provide services to the packet flow 617" and the end node Y (MNPS) 504", as is provided by the access node 505 to the end node (MT) X 504 and packets 617. Specific context state examples are the policy profile, the paging classifier, Multicast group membership and security associations needed by the access nodes 505, 505" for the end node (MT) X 504. Alternatively, this context state can be preconfigured in the access node 505" via a similar policy process such as AAA signaling that is used to deliver the context state to the access node 505, and the message 624 only used to carry incremental and/or temporary changes to that preconfigured state. Messages 624 and 622 can also be used to configure a tunnel 620 between access nodes 505 and 505" so that in-flight packets towards the end node (MT) X 504 can also be directed to the end node (MNPS) Y 504". The message 618" is sent from the access node 505" to the end node (MNPS) Y 504", following message 622/624, to inform end node (MNPS) Y 504" that it is now responsible for the packets to and from the home address of the end node (MT) X 504.

In advance of issuing messages 601 towards the foreign agent 505, the end node (MT) X 504 can issue message 634 to end node (MNPS) Y 504" using the home address of the end node (MT) X 504 as a source address and the interface address of end node (MNPS) Y 504" as the destination address. Message 634 generates a reply message 632. Message 634 is used to request that the end node (MNPS) Y 504" become the end point for packets to and from the home address of the end node (MT) X 504, to which the end node (MNPS) Y 504" responds with an acknowledgement message 632. Message 634 can include modifications to the application configuration at the application proxy in the end node (MNPS) 504", such as application control or data state, as well the filter state which is used by the end node (MNPS) Y 504" to select a subset of packet flows 617 for which the application proxy will process on behalf of the end node (MT) X 504. The reply message 632 can include the address of the access node 505" to which the end node (MNPS) Y 504" is connected so that the end node (MT) X 504 can include that address in message 601 to the access node 505 so that access node 505 knows the address of the access node 505" for the context transfer as part of message 624. Alternatively, both the interface address of the end node (MNPS) Y 504" and its access node 505" can be known in advance at the end node (MT) X 504. Messages 632 and 634 need to be at least authenticated and integrity protected to avoid the hijacking of packet flows. The end nodes (MT) X 504 and (MNPS) Y 504" therefore share a security association to secure messages between them, tied to the home address of end node (MT) X 504 and the interface address of end node (MNPS) Y 504". T his security association can be pre-configured, provided by a policy server or dynamically generated. The end node (MT) X 504 must know its MNPS end node Y 504" interface address in advance of sending message 634 but the end node (MNPS) Y 504" can be dynamically informed of the home address for which it is to provide application proxy services via the contents of message 634.

When end node (MT) X 504 wishes to reclaim the packet flow from the end node (MNPS) Y 504", then the end node (MT) X 504 sends and receives messages 601, 602, 603 and 604 to install into the home agent 532 and foreign agent 507 the dynamic CoA at its current access node 505, 505', which therefore overrules the default CoA at the home agent 532. In advance of this, the end node (MT) X 504 can send message 634 to end node (MNPS) Y 504" to request back the packet flow and to terminate the application proxy in the end node (MNPS) Y 504". The end node (MNPS) Y 504" can then inform the end node (MT) X 504 in message 632 when it is ready (i.e., when application data is at an appropriate stage to transfer control), and can return any associated application control state or data back to the end node (MT) X 504 so that the end node (MT) X 504 can continue with the application processing. Messages 624 and 622 can also be triggered by message 601 at the access node 505 to this time install a tunnel 620" back to the access node 505, for in-flight packets towards the access node 505" for the end node (MNPS) Y 504", creating the reverse of packet flow 620. Messages 624 and 622 can also recover the context state from access node 505" including any changes that have occurred at access node 505", back to access node 505. This enables the access node 505" to act as a temporary storage point for the context state if the end node (MT) X 504 should leave access node 505 causing that access node to eliminate said context state associated with that end node (MT) X 504. Message 618" is used to inform the end node (MNPS) Y 504" that it is no longer responsible for the set of packets to and from the home address of the end node (MT) X 504.

FIG. 7 shows an alternative embodiment of the invention that uses a MNPS CoA in the home agent 532 instead of the default CoA. This time it is the end node (MNPS) Y 504" that sends the registration signals to the home agent 532 via the foreign agent 507" as messages 601" and 602" which include the home address of end node (MT) X 504 and the CoA of the end node (MNPS) Y 504". This results in reply messages 603" and 604" along with the update of the binding in the home agent 532 to redirect packets from tunnel 610 to tunnel 610". The end node (MNPS) Y 504" is then able to redirect packets addressed to the home address away from the end node (MT) X 504. The end node (MNPS) Y 504" and foreign agent 507" should share a security association with the home agent 532 to secure these messages to avoid redirection attacks from unauthorized nodes. Note that the registrations from end node (MNPS) Y 504" do not eliminate the registration state issued by the end node (MT) X 504 itself, both of which are treated independently, but the registration state and specifically the CoA from the end node (MNPS) Y 504" is prioritized above that of the end node (MT) X 504. This is so that the end node (MNPS) Y 504" can safely redirect the packet flows of an end node (MT) X 504 when it is disconnected from the network or suffering a malfunction.

This time message 601" triggers message 622 which has a reply message 624. These are once again used to install temporary packet forwarding 620 between the access node 505 and the access node 505" and to fetch the context state from the access node 505. Similarly, messages 601", 602", 603", 604", 622 and 624 are used to redirect packet flow back to the end node (MT) X 504, and its access node 505, by canceling the MNPS CoA in the home agent 532, when the end node (MNPS) Y 504" no longer wishes to receive packets for the home address of end node (MT) X 504. Message 618 is used to inform the end node (MT) X 504, as a result of messages 622, 624 whether or not it is presently responsible for packets to its home address. The end node (MT) X 504 can trigger the end node (MNPS) Y 504" to send message 601", to either take or release the redirection of the packets, by first sending message 634 to the end node (MNPS) Y 504" which again responds with message 632. Other nodes such as the access node 505, CN 542 or home agent 532 can alternatively trigger the end node (MNPS) Y 504" to issue message 601" using messages similar to message 634.

FIG. 8 is the same as FIG. 6 apart from the fact that the MNPS CoA of end node (MNPS) Y 504" is this time a Co-located CoA which is equal to the interface address of end node (MNPS) Y 504". Redirected packet flow 611' is therefore now a tunnel directly between the home agent 532 and the end node (MNPS) Y 504", which avoids the need for the access node 505" needing a foreign agent function 507". In addition, in-flight packets 620 can be sent directly to the CCoA of the end node (MNPS) Y 504" rather than via the access node 505". However, if it is the end node (MNPS) Y 504" that issues the message 601" as in FIG. 7, rather than the end node (MT) X 504 as in FIG. 6, and that registration should be sent via the access node 505" or in-flight packets 620 are still sent to the access node 505, then the foreign agent 507" is still required.

Figure 9:
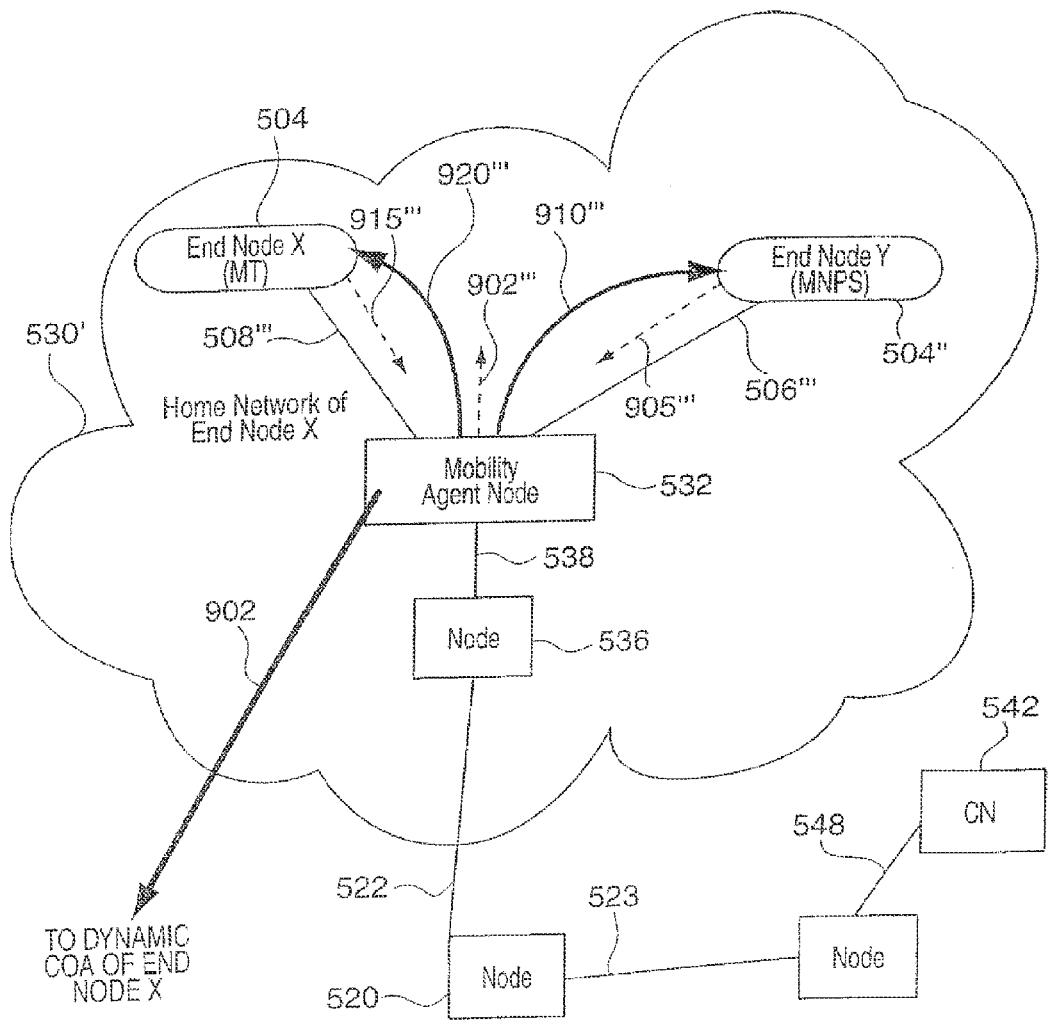
FIG. 9 illustrates a network diagram for an alternative exemplary communications system in which the invention is applicable, along with exemplary signalling and packets flows associated with said network.

FIG. 9 shows an alternative embodiment of the default CoA functionality in the special case that the end node (MNPS) Y 504" is on the same mac_layer network as the home agent 532, which is therefore also the home network 530' of the end node (MT) X 504. The FIG. 9 shows the networking between the CN 542 and the network 530 components of FIG. 5. FIG. 9 introduces links 508'" and 506'" which are used to connect end node (MT) X 504 and end node (MNPS) Y 504" to the home agent 532. The nodes run a protocol which distributes the mapping between the mac_layer address of each interface and its associated IP address, such as in the case of Address Resolution Protocol (ARP) or Neighbour Discovery in IPv6 (ND). When the end node (MT) X 504 is not on the home network 530' but is connected to a foreign access node such as 505, and the end node (MT) X 504 has a dynamic CoA in the home agent 532, then the home agent will send a proxy ARP signal 902'" with a mapping between its mac_layer address and the home address of the end node X 504, to indicate that packets addressed to that home address should be forwarded to it by all nodes on the mac_layer network. The home agent 532 then tunnels these packets to the current registered dynamic CoA as shown by the large solid arrow. When however the end node X (MT) 504 is on the home network 530' then it will issue the ARP message 915'" onto the mac_layer network, containing its mac_layer address on link 508'", so that such packets 920''' are instead forwarded to it. This ARP message 915''' cancels the proxy ARP message 902''' from the home agent 532 to all other nodes on the mac_layer network. Note that the home agent will typically not send message 902'''.

In an exemplary embodiment of the invention, the end node (MNPS) Y 504" can issue for example, without loss of generality, a proxy ARP message 905''' to redirect packets to the home address of the end node (MT) X 504, towards the end node (MNPS) Y 504" creating packet flow 910'''. This reproduces the redirection functionality of the MNPS CoA in the limited case of the end node (MNPS) Y 504" being on the home network. The proxy ARP messages: 902''' sent by the home agent 532, 915''' sent by end node(MT) X 504, and 905''' sent by end node (MNPS) Y 504" can be strictly ordered using a priority flag in the ARP messages, or the last message can instead be considered the latest configuration and a system of message suppression using internal priorities used by the nodes to identify who is the present receiver of packets addressed to the home address of end node (MT) X 504. The default CoA capability can be reproduced in this special case by instead storing a default ARP binding in the home agent 532 which is activated when the end node (MT) X 504 is neither on the home network nor has a valid dynamic CoA registered in the home agent 532. The default ARP binding is then advertised by the home agent and identifies the mac_layer address of the end node (MNPS) Y 504" rather than the mac layer address of the home agent 532.

Various alternative embodiments exist in the implementation of the invention. Firstly, the access node 505" can contain the home agent 532 whilst still using default and MNPS CoA features. In addition, it is possible for there to be multiple MNPSs for each home address, with filters used to route packets to the correct MNPS functionality for each subset of the packet flows. One of said MNPSs can also be located in the same node as the home agent 532. In addition, the MNPS software can be located in the access node 505". The invention can use Mobile IP v4 and/or v6 signaling and forwarding, including the various forwarding options including route optimisation. The various messages detailed in the invention can be used in various subsets and combinations as appropriate to the requirements of the application proxy in relation to the subset of packets being redirected from the end node (MT) X 504.

Some example application proxy features will now be described.

Firstly, the default CoA can be used to redirect all packets to an allocated home address, that does not have a registered dynamic CoA in the home agent 532, towards an application proxy that acts as an error-logger by simply capturing the packet headers.

Secondly, an extended IP paging system can be supported whereby the end node (MT) X 504 can go into sleep at the access node 505 and packets can be redirected to the access node 505" where a paging classifier is contained in the context state of the end node (MT) X 504. The paging classifier can decide whether packets are dropped, forwarded to the MNPS or trigger a paging message to the present location of the end node (MT) X 504, said location being accessible by the access node 505". Packets that are forwarded to the end node (MNPS) Y 504" are processed in the MNPS and application events can then trigger message 601" to return packet forwarding to the end node (MT) X 504 at its present location which is installed as the CoA in the home agent 532 using message 602". Alternatively, the MNPS can simply send message 632 towards the end node X 504 which will be passed to the access node 505" and will then trigger the paging function at that access node towards the present location of the end node (MT) X 504. The potential result of the paging function is the end node (MT) X 504 will wake up and wish to recover its packet reception and forwarding. It will therefore use message 601 to update the home agent with its present CoA, trigger 622/624 to recover its context state from the access node 505" and use message 634 and 622 to recover its application state from the MNPS.

Whilst the end node (MT) X 504 is asleep, the MNPS can issue keep-alive packets for any applications and protocols at the CN that require such keep-alives to maintain a session. The message 634/632 exchange is used by the end node (MT) X 504, along with preconfigured application proxy state, to inform the MNPS of the sessions to be refreshed, the refresh interval, any security state used to secure the keep-alive signalling, the keep-alive peer and the response behaviour if the session terminates or if incoming data packets arrive on that session. This enables the end node X (MT) 504 to go into power efficient extended sleep but not loose connectivity to application servers and networking gateways.

In a third application of the invention, a content distribution system can be developed whereby the end-node (MT) X 504 can order delivery of a piece of content but direct its delivery to the MNPS in the end node (MNPS) Y 504" using a filter in the home agent 532. The application proxy state in the MNPS can then direct a message to the end node (MT) X 504 when the content has been delivered in its entirety, or simply wait for the end node (MT) X 504 to query its delivery status. The end node (MT) X 504 or end node (MNPS) Y 504" can then use the methods of the invention to direct packets back to the end node (MT) X 504 and then the end node (MNPS) Y 504" can deliver the content to the end node (MT) X 504. This enables the end node X (MT) 504 to either go to sleep or use its bandwidth for other purposes whilst the content is delivered to end node (MNPS) Y 504", and then request delivery when it best suits that end node (MT) X 504.

In an alternative, content distribution system, the end node (MNPS) Y 504" can act as a content server for content from the end node (MT) X 504. The end node (MT) X 504 can then wake-up and efficiently deliver a content update to end node (MNPS) Y 504" whilst using filters to direct content requests to the content server at the end node (MNPS) Y 504". This avoids the end node (MT) X 504 from having to publish its content from either itself, or a fixed node, ensuring that the content is served locally. It also means that the server address is the same whether or not the end node (MT) X 504 or end node (MNPS) Y 504" is actually serving the content, so enabling the end node (MT) X 504 to serve a subset of flows, some or all of the time as it so wishes. Messages 634/632 keep the end node applications in synch whilst messages 601, 602, 603, 604, 622, 624 and 618 manage the packet forwarding.

Figure 10:
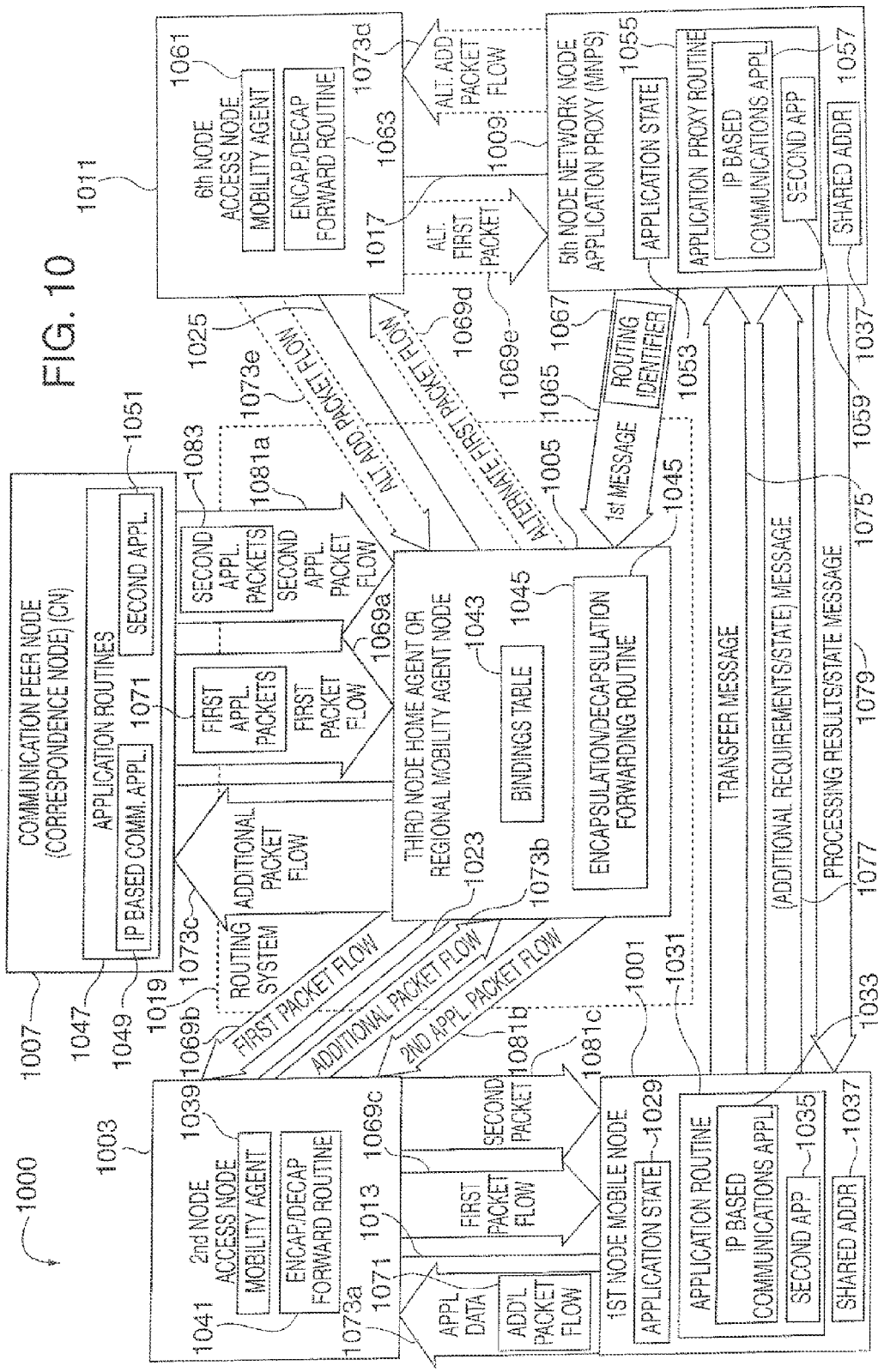
FIG. 10 illustrates yet another exemplary communication system and related signalling.

FIG. 10 illustrates an exemplary communications system 1000 in accordance with one particular exemplary embodiment of the present invention. The system 1000 includes a first node, e.g., mobile node 1001, a second node, e.g., access node 1003 which may be used as a MIP Foreign Agent, a third node, e.g., a regional mobility agent node 1005 which may be a MIP home agent, a fourth node, e.g., a communication peer node 1007 sometimes called a correspondence node, fifth node, e.g., a network node 1009, and a sixth node, e.g., an access node 1011. Mobile node (MN) 1001 is coupled to access node 1003 via wireless link 1013. Network node 1009 is coupled to access node 1011 via link 1017. Home Agent or Regional Mobility Agent Node 1005 is included in a routing system 1019. Home Agent or Regional Mobility Agent Node 1005 is coupled to Access Node 1003, Access Node 1011, and Communication Peer Node 1007 via links 1023, 1025, 1027 respectively. Access Nodes 1003, 1011 are normally part of the routing system 1019. Second node, e.g., access node 1003, has a defined route, e.g., a route defined by a routing table included in internal memory, which is used to forward packets with a CoA corresponding to said mobile node 1001 to said mobile node. Sixth node, e.g., access node 1011, has a defined route, e.g., a route defined by a routing table included in internal memory, which is used to forward packets with a CoA corresponding to said mobile node 1001 to said fifth node 1009 the Mobile Node proxy Server (MNPS), when the MNPS is responsible for processing application packets corresponding to the shared address common to both the MN 1001 and MNPS 1009. The various nodes may be located in different addressing domains, with addresses associated with said different domains including different address prefixes used to distinguish between the different addressing domains. The system 1000 includes at least two addressing domains but may include more e.g., 3 addressing domains. The Home mobility agent node 1005 is normally located in a different domain from the FA node, e.g., the second node 1003, and the FA node 1003 is normally located in the same domain as the regional mobility agent 1005. The other nodes 1011, 1009 may be in the same domain as the FA node 1003 or home agent 1005, or located in a different domain altogether, e.g., a third addressing domain which is identified by a third prefix which is included in addresses corresponding to nodes located in the third addressing domain.

MN 1001 includes application state 1029, and application routines 1031 including an IP based communication application 1033 and a second application 1035, and a shared address 1037. Access node 1003 includes a mobility agent 1039 and encapsulation/descapsulation and forwarding routine 1041. Access node 1003 may be a base station or access router used by MN 1001. Mobility Agent 1039 may act as a Foreign Agent (FA) for MN 1001 while MN 1001 is in the foreign domain in which Access Node 1003 is located. Home Agent or Regional Mobility Agent Node 1005 includes a bindings table 1043 and an encapsulation/descapsulation forwarding routine 1045. Life time information may be included with the address binding information included in bindings table 1043. Node 1005 may act as the Home Agent (HA) for MN 1001. Communication peer node 1007 includes application routines 1047, e.g., software applications, including an IP based communications application (first application) 1049 and a second application 1051. Fourth node 1007 is the correspondence node (CN) to which MN 1001 is corresponding with in an exemplary communications session in which the first application 1033 is involved. Network Node 1009 operates as an application proxy during at least some period of time when the MN 1001 is unavailable to continue interacting with a first application, and may be a Mobile Node Proxy Server (MNPS). As part of acting as an application proxy the MNPS 1009 receives packets corresponding to an application flow which have a destination address corresponding to the MN 1001 and processes the received packets. Processing may include generating at least one packet from the body of two received packets and transmitting the generated packet to the CN 1007. Node unavailablilty may be the result of a decision by the MN 1001, e.g., to enter a sleep state or due to an event outside the control of the MN 1003 such as signal loss due to interference. When Node 1009 is acting as a MNPS, node 1009 may communicate with CN 1007 in place of MN 1001. In order for application processing and control to be passed between the MN 1001 and MNPS 1009 application state, e.g., information on the current status of application processing and/or results of processing packets received from the CN 1007, are exchanged between the MN 1001 and MNPS 1009. This may involve handing application processing off to the MNPS 1009 and then handing back application responsibility to the MN 1001 along with the state indicating where the MNPS 1009 left off in regard to application processing. Responsibility for different applications may be handed-off between the MN 1001 and MNPS 1009 at different times. Routing control signals sent to the routing system 1019 are used to insure that a flow of packets corresponding to an application is routed to the MN or MNPS responsible for processing the packets corresponding to the particular application at any given point in time. Thus, different packet flows, corresponding to different MN applications 1033, 1035 can be classified by the routing system 1019 and routed to different nodes. In fact, different MNPS nodes 1009 may be used to support different applications on behalf of the MN 1001 when the MN is unavailable. In addition, while the MN may be unavailable for one application it can continue to processes packets relating to another application. Thus, responsibility for one or more subsets of the applications 1033, 1035 which the MN is actively using, may be handed off to the MNPS 1009 at different points in time. The correspondence node 1007 need not be informed as to whether the MN 1001 or MNPS 1009 is receiving and processing packets corresponding to a particular application and may continue operation under the assumption that it is interacting with the MN 1001 in regard to a particular application at all times. As will be discussed below, signals to the routing system 1019 regarding redirection of packets corresponding to a particular application associated with the MN 1001 may be sent to the RS 1019 from either the MN 1001 or MNPS 1009. These signals normally include a routing identifier which identifies the node 1001 or 1009 to which the application packets are to be directed. In some cases, the routing identifier identifies an intermediate node, e.g., FA 1003 which has a determined route to the node to which the application packets are to be directed. In such cases, the identified intermediate node receiving the packets intended for the MN or MNPS, forwards the packets to the destination node, e.g., the MN or MNPS with which it has the routing relationship. This relationship will normally be reflected in binding tables used to route packets to the MN or MNPS which is included in the intermediate node 1003 or 10011. The routing identifier sent to the RS 1019 may be, e.g., an address corresponding the MN or MNPS or a combination of an address and some other routing information such as a weight used to affect a routing decision made by the RS 1019. The routing identifier may further optionally include additional information, such as a packet classifier, to enable the routing system to detect packets belonging to the first or second applications 1049, 1051 at the CN 1007, and to direct the first and second application packets to different Nodes 1001, 1009. When the packet classifier is missing from the routing identifier, then the routing system redirects all packets in the first packet flow 1069 to the identified node in the routing identifier.

Node 1009 includes application state 1053, application proxy routines 1055 including an IP based communication application proxy routine corresponding to the first application 1057 and a second application proxy routine 1059 corresponding to the second supported application, and shared address 1037. Shared Address 1037 corresponds to both MN 1001 and network node (MNPS) 1009. Access Node 1011 includes a Mobility Agent 1061 and an Encapsulation/Decapsulation forwarding routine 1063. Access Node 1011 couples network node 1009 to the rest of the system 1000.

During system operation, in accordance with the present invention, MN 1001 or Network Node (MNPS) 1009 sends a first message 1065 to the Routing System 1019 and its node 1005. FIG. 10 shows Message 1065 being sent by network node (MNPS) 1009. First Message 1065 includes a routing identifier 1067. Routing identifier 1067 uniquely identifies a node being in the group of nodes including MN 1001, network node (MNPS) 1009, and a node having a defined route to MN 1001 or MNPS 1009 such as the second node 1003 and 6th node 1011. The routing system 1019 directs a first packet flow 1069 from CN 1007, e.g., a flow corresponding to the first application to either MN 1001 or network node (MNPS) 1009. At least some of the packets in packet flow 1069 correspond to first application packets 1071. The node identified by the routing identifier, e.g., one of MN 1001 or network node (MNPS) 1009, receives the first packet flow 1069 at any given point in time. The packet flow is directed to the node 1001 or 1009 which is responsible for application processing and interacting with the CN 1007 at any given point in time. First packet flow 1069 may include, e.g., during a first period of time, first packet flow 1069*a* from CN 1007 to Home Agent Mobility Node 1005, first packet flow 1069*b* from Home Agent Mobility Node 1005 to Access Node 1003, and first packet flow 1069*c* from Access Node 1003 to MN 1001. Alternately, e.g., during a second period of time, first packet flow 1069 includes: first packet flow 1069*a* from CN 1007 to Home Agent Mobility Node 1005, alternate first packet flow 1069*d* from Home Agent Mobility Node 1005 to Access Node 1011, and alternate first packet flow 1069*e* from Access Node 1011 to Network Node (MNPS) 1009.

In the case where MN 1001, receives first packet flow 1069*c*, IP based communications application routine 1033 processes the received packets and generates additional packets containing application data 1071 as a result of said application processing, and transmits the packets in additional packet flow 1073 to CN 1007. Additional packet flow 1073 includes: additional packet flow 1073*a* from MN 1001 to Access Node 1003, additional packet flow 1073*b* from Access Node 1003 to Home Agent Mobility Node 1005, and additional packet flow 1073*c* from Home Agent Mobility Node 1005 to CN 1007. Similarly, in the case where the Network Node (MNPS) 1009 received alternate first packet flow 1069*e*, IP based communication application proxy routine 1057 processes the received packets and generates additional packets as a result of said proxy application processing, and transmits the packets in additional packet flow 1073 including: alternate additional packet flow 1073*d* from Network Node (MNPS) 1009 to Access Node 1011, alternate additional packet flow 1073*e* from Access Node 1011 to Home Agent Mobility Node 1005, additional packet flow 1073*c* from Home Agent Mobility Node 1005 to CN 1007.

In accordance with one embodiment of the present invention, prior to transmitting first message 1065, a transfer message 1075 is sent from MN 1001 to network node (MNPS) 1009. This message 1075 is used to initiate a transfer of responsibility for processing application packets originating from the CN 1007 from the first node 1001 or fifth node 1009 to the one of the first and fifth nodes which is not responsible at the time of the transfer message 1075 for application processing. Transfer message 1075 may include the routing identifier which identifies the node which is to take over responsibility for application processing. Network node (MNPS) 1009 responds to transfer message by transmitting first message 1065 which includes said routing identifier. Additional Message 1077 from MN 1001 to network node (MNPS) 1009 defines the requirements of the MN 1001 for the processing of packets by the application proxy, network node (MNPS) 1009 and is transmitted when said MNPS 1009 is to take over responsibility for application processing from said mobile node 1001. State Information, for example MN application state 1029 is also included in Message 1077 and may be transferred into MNPS application state 1053. This allows the MNPS to continue application processing from the point at which the MN 1001 transferred responsibility for application processing to the MNPS 1009. A Processing Results/State Message 1079 from network node (MNPS) 1009 to MN 1001 returns information to MN 1001 derived from the processing of packets by the application proxy, network node (MNPS) 1009. The returned information may include a packet, e.g., an application data packet, generated from processing the body of at least two packets corresponding to the first packet flow which are received by the MNPS 1009. This message is sent when responsibility for application processing is being returned to the mobile node 1001 thereby allowing the mobile node to continue application processing from the point where the MNPS 1009 ceased being responsible for application processing.

A second application is supported by CN 1007 through a second application routine 1051. The second application is supported by MN 1001 through the use of a second application routine 1035, and in Network Node (MNPS) 1009 through the use of second application proxy routine 1059. A second application packet flow 1081 including second application packets 1083 is shown in FIG. 10 including: second application packet flow 1081*a* from CN 1007 to Home Agent Mobility Node 1005, second application packet flow 108 1*b* from Home Agent Mobility Node 1005 to Access Node 1003, and second application packet flow 1081*c* from Access Node 1003 to MN 1001. Alternatively, the packet flow could have been directed to Network Node (MNPS) 1009 instead of MN 1001 at a different time. The associated messages, signaling, return packet flows, and alternative flows are similar or identical to those described regarding the first application and shall not be repeated for purposes of brevity for the second application. Thus, the routing system can act as a filter sending application packets corresponding to one MN application to the MN proxy 1009 while still sending application packets corresponding to the second MN application to the mobile node 1001. It should be appreciated that mobile node availability may be different for different applications supported by the MN at the same time. Thus, in various embodiments, the first message indicates whether packets corresponding to a particular individual application or applications identified in the message are to be redirected to the identified node or if packets corresponding to all applications supported by the MN 1001 are to be redirected, e.g., to the MNPS 1009. Thus, packets corresponding to different applications may correspond to different packet flows for routing system purposes despite being having a source address corresponding to the CN address and a destination address corresponding to the shared address of the first and fifth nodes 1001, 1009.

In a further embodiment, the third node 1005, fifth node 1009 and sixth nodes 1011 are on the same network and therefore share mac-layer connectivity. Note that in this case the third node and the sixth nodes may be the same node which includes both a home and foreign mobility agent. The fifth node can issue a first message 1065 containing a routing identifier 1067 which is the mac-layer address of the fifth node. This is entered into the binding table 1043 in the third node as the current mac-layer CoA for the first packet flow such that packets are forwarded to the fifth node via the mac-layer address of the fifth node. Further, this mac-layer CoA can also be stored in the binding table 1043 as a default mac-layer CoA such that when the lifetime of binding table entry pointing to the second address (CoA) of the first node at the second node expires, then packets are automatically diverted in the third node to the fifth node via mac-layer forwarding. When the first node returns home to the network comprising the third fifth and sixth nodes, the first node can issue a first message 1065 with a routing identifier 1067 equal to its mac_address which due to the broadcast nature of such natures is received by the third, fifth and sixth nodes, which causes the fifth node to stop refreshing its mac_address in the binding table for the first packet flow. This new mac-layer CoA supercedes that previously issued by the fifth node and therefore the first packet flow will be directed to the first node.

In accordance with the present invention, addressed assigned to various nodes may be located in the same or different addressing domains. In some embodiments the addresses assigned to the first, third and fifth nodes are in a first addressing domain. In such a case the home address of the MN 1001 is from the same address prefix as the address of the third node and is shared with the fifth node. A fifth address associated with either the fifth or sixth nodes is often in a second addressing domain (e.g., the CoA address of the MNPS 1009 is normally from the same address prefix as the address of the access router). The second node and a second address corresponding to the second node can be in yet another addressing domain, e.g., in a third addressing domain. This may be due to the movement of the MN 1001 onto a foreign subnet and the second address being the CoA of the MN 1001. In various embodiments the first, second and third addressing domains include correspond to at least two different addressing domains. In other cases, the first, second and third addresses are in three different addressing domains. In still yet other embodiments, the first, the second and the third addresses are all in the same addressing domain. Thus, the present invention allows for a wide range of possibilities in regard to which addresses, and thus which nodes, are in the same or different addressing domains. Addressing domains are different if the addresses used within the domains have different address prefixes of the same prefix length, i.e. the set of N most significant address bits are different. Thus, addresses having the same prefix of length N, are determined to be in the same domain where N indicate prefix length and thus the number of bits used to distinguish between different domains. In various embodiments at least one of the first, second and third addressing domains is different from another one of said first, second and third addressing domains with addresses corresponding to different domains including different address prefixes. In one of such various embodiments said first and third addressing domains are the same and said second addressing domain is different from said first and second addressing domains. In another one of such various embodiments the second and third addressing domains are the same, and said first addressing domain is different from said first and second addressing domains. One or more addresses may be associated with each node, the associated address having the address prefix of the addressing domain in which the node is located.

The present application hereby expressly incorporates the U.S. Provisional Patent Applications listed in the Related Application section of this patent application. However, it is to be understood that any mandatory language such as, e.g., must, is required, and necessary, found in the provisional application is to be interpreted as applying to the examples and embodiments described in the particular provisional application and in no way limits the scope of the claims or invention described in the text of this application.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s). The methods and apparatus of the present invention are applicable to a wide range of communications systems including many OFDM, CDMA and other non-OFDM systems.

The methods and apparatus of the present invention may be, and in various embodiments are, used with CDMA, orthogonal frequency division multiplexing (OFDM), and/or various other types of communications techniques which may be used to provide wireless or fixed communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

Numerous additional variations on the methods and apparatus of the present invention described above will be apparent to those skilled in the art in view of the above description of the invention. Such variations are to be considered within the scope of the invention.

What is claimed is:

1. An apparatus in a communication network, comprising: a memory;
a processor coupled to said memory; and
circuitry coupled to at least one of said processor or said memory and cooperatively configured to act as a proxy entity on behalf of an end node during a time when said end node is inaccessible for communications, wherein the apparatus, acting as the proxy entity, is configured to create and send first packets to a correspondence node on behalf of the end node, function as a network end point for second packets that are addressed to a home address of the end node, and process application data within the second packets as if the proxy entity were the end node.

2. The apparatus as in claim 1 wherein said communication network includes communication operations operated under the mobile internet protocol (MIP).

3. The apparatus as in claim 2 wherein said apparatus manages the MIP binding of said end node.

4. The apparatus as in claims 1 wherein said apparatus further including a receiver configured to receive a request message from said end node via said communication network to act as a proxy entity on behalf of said end node.

5. The apparatus as in claim 4 wherein said request message includes security association.

6. The apparatus as in claim 1 wherein said end node communicates with an agent entity which includes a default address of said apparatus such that when said end node is inaccessible for communications, said agent entity uses the default address of said apparatus so as to allow said apparatus to act on behalf of said end node.

7. The apparatus as in claim 6 where said agent entity is a home mobility agent having the care of address (CoA) of said apparatus, whereby upon request of said apparatus, said home mobility agent communicates with said apparatus via said CoA.

8. The apparatus as in claim 7 wherein said request is sent through a request message which includes security association.

9. The apparatus as in claim 1 being installed in a server.

10. The apparatus as in claim 1 being installed in a mobile terminal.

11. The apparatus of claim 1, wherein acting as the proxy entity further comprises responding to keep-alives from Internet applications.

12. A wireless apparatus in a communication network, comprising:
 a processor; and
 circuitry coupled to said processor cooperatively configured to inform an entity in said communication network as a proxy entity to act on behalf of said wireless apparatus during the time when said wireless apparatus is inaccessible for communications, wherein acting on behalf of said wireless apparatus comprises creating and sending first packets to a correspondence node on behalf of the wireless apparatus, functioning as a network end point for second packets that are addressed to a home address of the wireless apparatus, and processing application data within the second packets as if the proxy entity were the wireless apparatus.

13. The wireless apparatus as in claim 12 wherein said communication network includes communication operations operated under the mobile interne protocol (MIP).

14. The wireless apparatus as in claims 12 further including a transmitter configured to transmit a request message via said communication network to said proxy entity to act on behalf of said wireless apparatus.

15. The wireless apparatus as in claim 14 wherein said request message includes security association.

16. The wireless apparatus as in claim 12 being further configured to communicate with an agent entity which includes a default address of said proxy entity such that when said wireless apparatus is inaccessible for communications, said agent entity uses the default address of said proxy entity thereby allowing said proxy entity to act on behalf of said end node.

17. The apparatus as in claim 16 where said agent entity is a home mobility agent having the care of address (CoA) of said apparatus, whereby upon request of said proxy entity, said home mobility agent communicates with said proxy entity via said CoA.

18. An infrastructure apparatus serving as an access node in a communication network, comprising:
 a memory;
 a processor coupled to said memory; and
 circuitry coupled to at least one of said processor or said memory and cooperatively configured to coordinate a proxy entity to act on behalf of an end node during a time when said end node is inaccessible for communications, wherein the infrastructure apparatus, acting on behalf of the end node, is configured to create and send first packets to a correspondence node on behalf of the end node, function as a network end point for second packets that are addressed to a home address of the end node, and process application data within the second packets as if the proxy entity were the end node.

19. The apparatus as in claim 18 wherein said communication network includes communication operations operated under the mobile interne protocol (MIP).

20. The apparatus as in claims 19 wherein said infrastructure apparatus further including a receiver configured to receive a request message from one of said end node and said proxy entity via said communication network so as to coordinate said proxy entity to act on behalf of said end node.

21. The apparatus as in claim 20 wherein said request message includes security association.

22. The apparatus as in claim 18 wherein said infrastructure apparatus includes a default address of proxy entity such that when said end node is inaccessible for communications, said infrastructure apparatus uses the default address so as to allow said proxy apparatus to act on behalf of said end node.

23. A wireless communication method operable by a communication node in a communication system having an access node and an end node, comprising:
 communicating with said access node; and
 acting as a proxy entity on behalf of said end node in response to a message in communicating with said access node, wherein acting as the proxy entity comprises creating and sending first packets to a correspondence node on behalf of the end node, functioning as a network end point for second packets that are addressed to a home address of the end node, and processing application data within the second packets as if the proxy entity were the end node.

24. A computer program product including a non-transitory computer-readable medium having computer code for:
 communicating with an access node in a communication network which includes said access node and an end node; and
 acting as a proxy entity on behalf of said end node in response to a message in communicating with said access node, wherein acting as the proxy entity comprises creating and sending first packets to a correspondence node on behalf of the end node, functioning as a network end point for second packets that are addressed to a home address of the end node, and processing application data within the second packets as if the proxy entity were the end node.

25. A communication node in a communication system having an access node and an end node, comprising:
 means for communicating with said access node; and
 means for acting as a proxy entity on behalf of said end node in response to a message in communicating with said access node, wherein acting as the proxy entity comprises creating and sending first packets to a correspondence node on behalf of the end node, functioning as a network end point for second packets that are addressed to a home address of the end node, and processing application data within the second packets as if the proxy entity were the end node.

26. The communication node of claim 25, further comprising means for receiving a request message from said end node to act as the proxy entity on behalf of said end node.

27. The communication node of claim 26, wherein said request message includes security association.

28. The communication node of claim 25, wherein said communication system includes communication operations operated under the mobile internet protocol, and further comprising means for managing the mobile internet protocol binding of said end node.

* * * * *